(12) United States Patent
Ito et al.

(10) Patent No.: US 8,451,365 B2
(45) Date of Patent: May 28, 2013

(54) IMAGE CONTROL APPARATUS, IMAGE CONTROL METHOD, AND RECORDING MEDIUM

(75) Inventors: Kensei Ito, Sagamihara (JP); Tomomi Kaminaga, Musashino (JP); Takashi Fujii, Tokorozawa (JP)

(73) Assignee: Olympus Imaging Corp., Tokyo (JP)

( * ) Notice: Subject to any disclaimer, the term of this patent is extended or adjusted under 35 U.S.C. 154(b) by 297 days.

(21) Appl. No.: 12/872,926

(22) Filed: Aug. 31, 2010

(65) Prior Publication Data

US 2011/0058087 A1 Mar. 10, 2011

(30) Foreign Application Priority Data

Sep. 4, 2009 (JP) ................................. 2009-204299

(51) Int. Cl.
*H04N 5/222* (2006.01)
(52) U.S. Cl.
USPC .................................................. 348/333.05
(58) Field of Classification Search
USPC .................... 348/333.02, 333.05; 707/915
See application file for complete search history.

(56) References Cited

U.S. PATENT DOCUMENTS

| 7,783,085 | B2* | 8/2010 | Perlmutter et al. | 382/118 |
| 8,175,340 | B2* | 5/2012 | Tsutsui | 382/113 |
| 8,189,071 | B2* | 5/2012 | Murai | 348/231.2 |
| 2005/0036692 | A1* | 2/2005 | Iida et al. | 382/217 |
| 2007/0030283 | A1* | 2/2007 | Shiraishi et al. | 345/581 |
| 2007/0065044 | A1* | 3/2007 | Park et al. | 382/305 |
| 2008/0030488 | A1 | 2/2008 | Kobayashi | |
| 2008/0068456 | A1* | 3/2008 | Fujii et al. | 348/130 |
| 2008/0189270 | A1 | 8/2008 | Takimoto et al. | |
| 2008/0256488 | A1 | 10/2008 | Van De Sluis et al. | |

FOREIGN PATENT DOCUMENTS

JP 2007-226536 9/2007

OTHER PUBLICATIONS

First Notification of Office Action for Chinese Patent Application No. 201010275245.7, mailed Jul. 3, 2012 (5 pgs.) with translation (6 pgs.).

* cited by examiner

*Primary Examiner* — Albert Cutler
(74) *Attorney, Agent, or Firm* — John C. Pokotylo; Straub & Pokotylo

(57) ABSTRACT

An image control apparatus which controls a search screen for searching a related image, comprises: an attribute display section setting a reference image and causing to display a specific condition in each of the attributes of the reference image; a related image display section causing to display the related image which has been searched by an image search section according to the specific attribute condition selected from among the displayed specific conditions; a search screen display section causing to display the search screen including at least the reference image, the specific condition in each of the attributes of the reference image, and the searched related image; and a change screen display section causing to display a change screen for changing the specific attribute condition to be used for the search to a condition except the specific condition in each of the attributes related to the reference image.

14 Claims, 12 Drawing Sheets

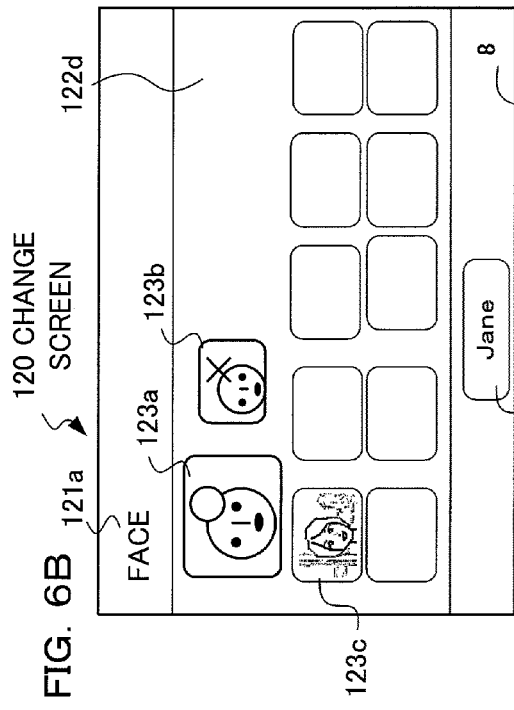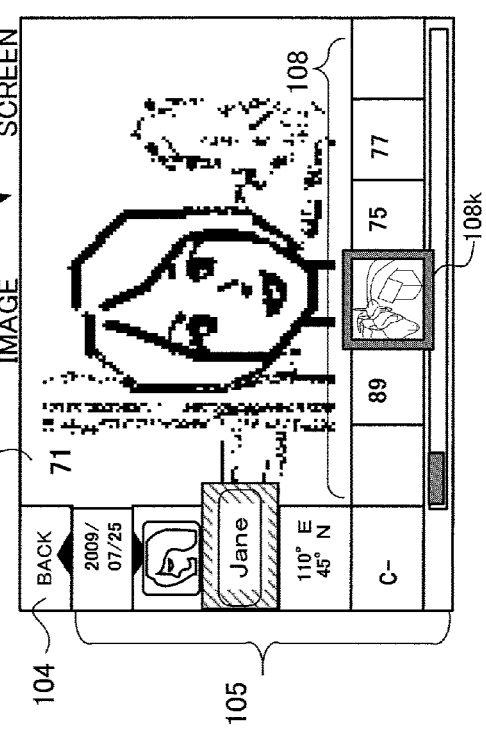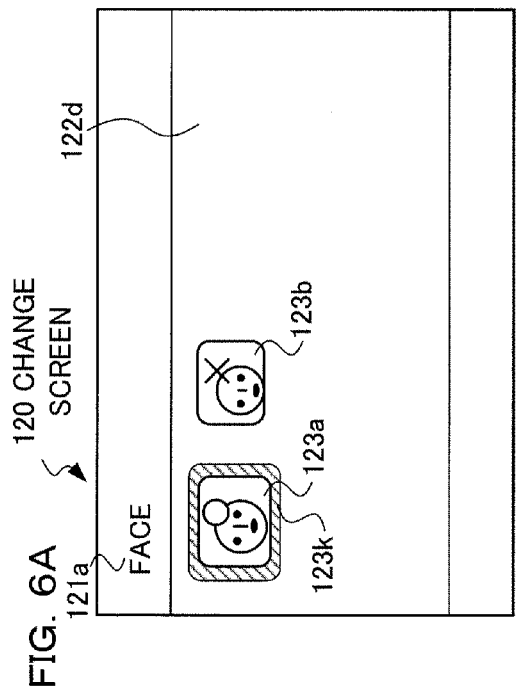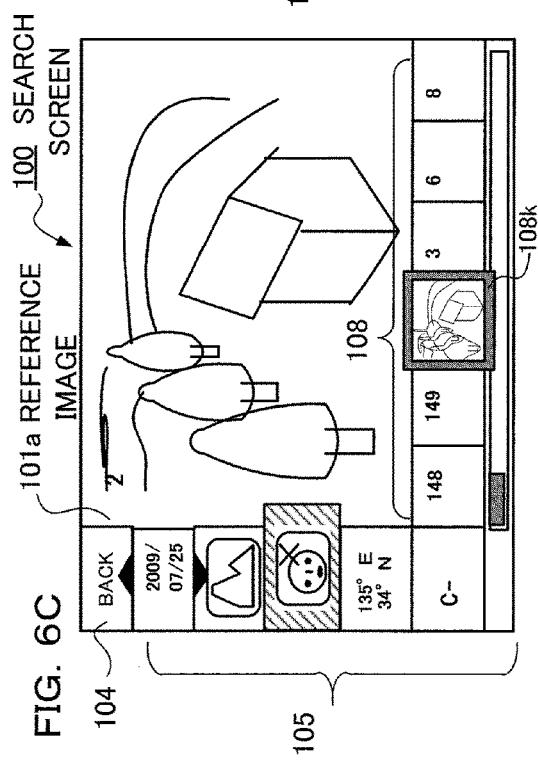

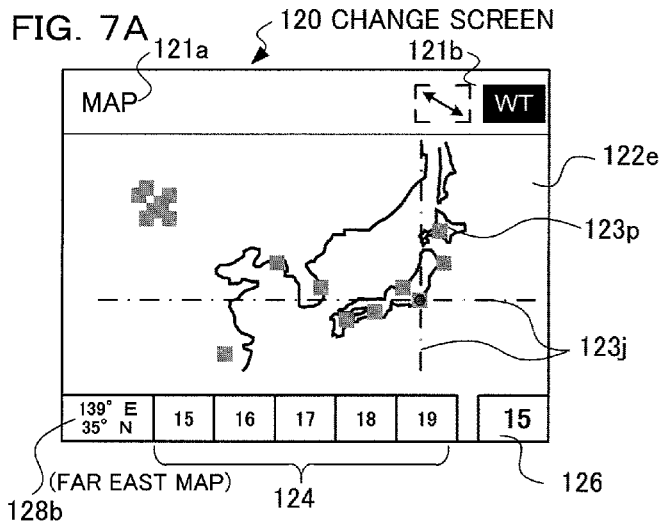
FIG. 7A
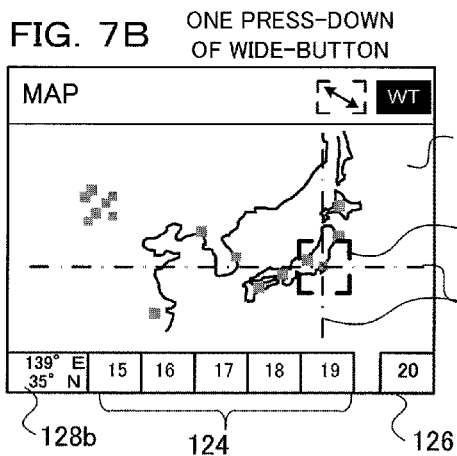
FIG. 7B ONE PRESS-DOWN OF WIDE-BUTTON
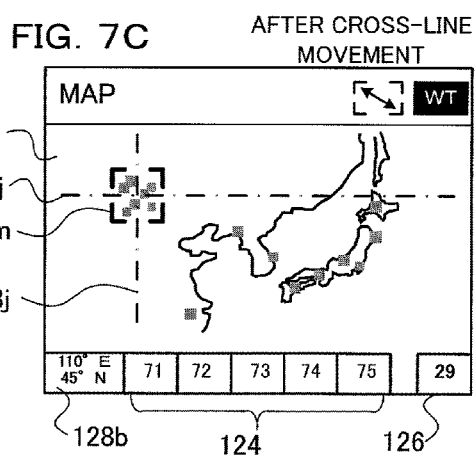
FIG. 7C AFTER CROSS-LINE MOVEMENT
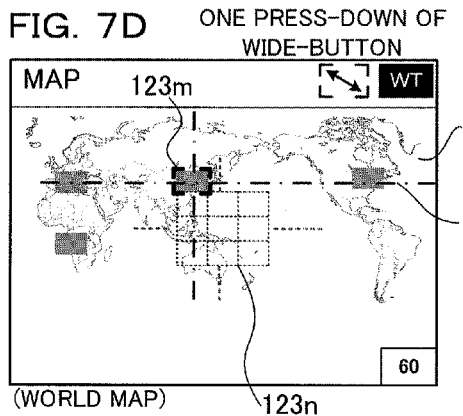
FIG. 7D ONE PRESS-DOWN OF WIDE-BUTTON
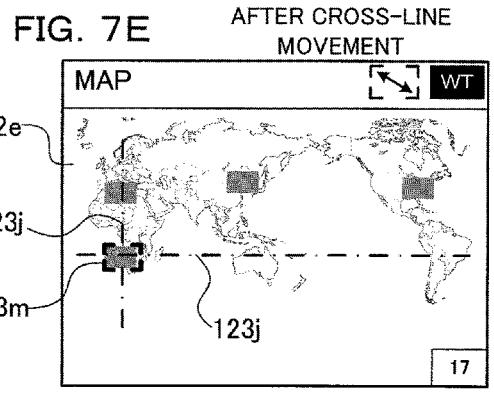
FIG. 7E AFTER CROSS-LINE MOVEMENT

IMAGE CONTROL APPARATUS, IMAGE CONTROL METHOD, AND RECORDING MEDIUM

Benefit is claimed, under 35 U.S.C. §119, to the filing date of prior Japanese Patent Application No. 2009-204299 filed on Sep. 4, 2009. This application is expressly incorporated herein by reference. The scope of the present invention is not limited to any requirements of the specific embodiments described in the application.

BACKGROUND OF THE INVENTION

1. Field of the Invention

The present invention relates to image control apparatuses and image control methods, and, in detail, relates to an image control apparatus and an image control method for performing image reproduction and display in a camera, a personal computer, or the like.

2. Description of the Related Art

A recent image device such as a digital camera, an image viewer, a personal computer, and the like comes to have a large capacity of memory. Accordingly, a large amount of images needs to be stored and managed in a single device, and therefore an image search function for searching an object image from among the large amount of images attracts attention as an important technique.

As a conventional search method, it is generally known to display corresponding thumbnail images in a lump for each photographing date or for each folder. However, this method is not sufficient for the search of a large amount of images, and therefore various kinds of search method are proposed such as a method of performing the search by the content of a photographed object image.

For example, Japanese Patent Application Laid-Open Publication No. 2007-226536 (published on Sep. 6, 2007) discloses an image search apparatus which searches and displays like images of a specific image according to a composition, the number of persons, a hue distribution, an object person, or the like. Further, Japanese Patent Application Laid-Open Publication No. 2008-41155 (published on Feb. 21, 2008) discloses a display control apparatus which displays for selection a content searched corresponding to a search condition by arranging tabs each indicating the search condition for detecting the content in the horizontal direction of a screen and by disposing an icon searched under the condition of each of the tabs vertically under the tab.

SUMMARY OF THE INVENTION

The present invention aims at providing an image control apparatus and an image control method capable of searching and browsing even images having a weak relationship with one another.

An image control apparatus according to the present invention which controls a search screen for searching a related image, comprises: an image search section searching the related image according to an image attribute; an attribute display section setting an image serving as a reference of the search as a reference image and causing to display a specific condition in each of the attributes of the reference image; a related image display section causing to display the related image which has been searched by the image search section as an image related to the reference image according to the specific attribute condition selected from among the displayed specific conditions; a search screen display section including each of the attribute display section and the related image display section and causing to display the search screen including at least the reference image, the specific condition in each of the attributes of the reference image, and the searched related image; and a change screen display section causing to display a change screen for changing the specific attribute condition to be used for the search to a condition except the specific condition in each of the attributes related to the reference image.

Further, an image control method according to the present invention which performs processing of displaying on a display section a search screen for searching an image, comprises the steps of: displaying on the search screen a reference image serving as a reference for search; causing to display on the search screen a specific condition in each attribute of the reference image, which represents an image attribute of the reference image; searching a related image related in the specific attribute condition selected from among the displayed specific conditions, and displaying the related image on the search screen; and causing to display a change screen for changing the specific attribute condition to be used for the search to a condition except the specific condition in each of the attributes related to the reference image when an instruction is provided to switch the search screen to the change screen.

BRIEF DESCRIPTION OF THE DRAWINGS

FIGS. 6A to 6D are diagrams illustrating operation on a face change screen in a digital camera according to an embodiment of the present invention.

FIGS. 7A to 7E are diagrams illustrating operation on a photographing position change screen in a digital camera according to an embodiment of the present invention.

DETAILED DESCRIPTION OF THE PREFERRED EMBODIMENTS

Hereinafter, preferred embodiments will be described according to the drawings by the use of a digital camera to which the present invention is applied. A digital camera according to a preferred embodiment of the present invention has an imaging section, and converts an object image into image data with this imaging section and then, according to this converted image data, displays the object image on a display section disposed on the rear side of a main body in a live view display. A photographer determines a composition and a shutter chance by observing the live view display. In release operation, the image data is recorded into a recording medium and information such as a photographing date and time and a photographing mode is recorded together at this time. Further, the photographed image recorded in the recording medium can be reproduced and displayed on the display section when a reproduction mode is selected. At this time, it is possible to change conditions such as the photographing date and time and the photographing mode and to search and display an image satisfying these conditions.

Figure 1:
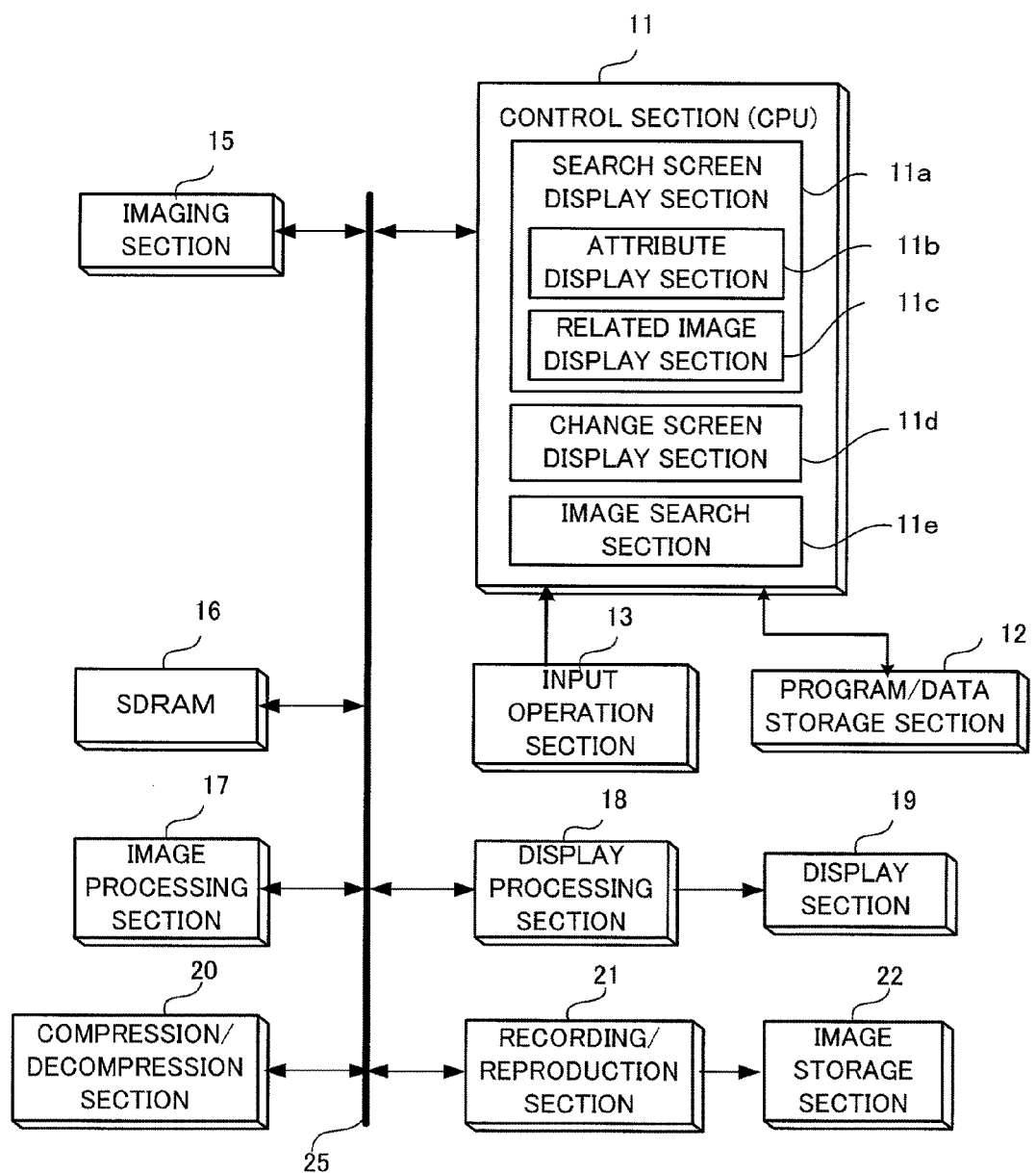
FIG. 1 is a block diagram showing a configuration of a digital camera according to an embodiment of the present invention.

FIG. 1 is a block diagram showing a configuration of a digital camera according to an embodiment of the present invention. A control section (CPU: Central Processing Unit) operates according to a control program stored in a program/data storage section 12 and performs the entire control of the digital camera. The control unit 11 includes a search screen display section 11a, an attribute display section 11b, a related image display section 11c, a change screen display section 11d, and an image search section 11e. Each of 11a to 11e within the control section 11 is a part of processing performed by the control program and therefore will be explained as a functional section included in the control section 11.

The search screen display section 11a, as described hereinafter by the use of FIG. 2B, causes a display section 19 to display a search screen for image search and includes the attribute display section 11b and the related image display section 11c. The attribute display section 11b displays an attribute for the image search such as a photographing date and time, a photographing scene, and a photographing position, on the search screen. The related image display section 11c displays an image having an attribute designated in the attribute display section 11b (hereinafter, called a related image) in thumbnail view on the search screen.

The change screen display section 11d displays a screen for changing the attribute displayed by the attribute display section 11b. For example, the change of the attribute is performed by an operator, such as the change of the photographing date and time selected by the attribute display section 11b or the change of a program mode selected as the photographing scene to another mode (e.g., landscape mode). When the attribute is changed by the attribute display section 11b, the image search section 11e performs the search of an image belonging to the changed attribute from among the images stored in an image storage section 22.

The control section 11 is connected with a program/data storage section 12, an input operation section 13, and a bus 25. The program/data storage section 12 stores the program to be executed in the control section 11 as described above and also stores various kinds of data.

The input operation section 13 detects the operation state in each of various kinds of operation members for a user to provide an instruction to the camera. The various kinds of operation members include a power button, a cross button having up/down and left/right keys, an OK button, a mode switch button and the like. The mode switch button includes an operation button performing switching to a search mode (hereinafter, called a photo-surfing function) which searches an image having any relationship although not a strong relationship. Since to browse a HP (homepage) of the Internet by successively switching the page is called net surfing, the search mode of the present embodiment, which can successively search for also an image except an image having a strong relationship, is named photo surfing.

The bus 25 is connected with an imaging section 15, an SDRAM 16, an image processing section 17, a display processing section 18, a compression/decompression section 20, and a recording/reproduction section 21, in addition to the control section 11. The imaging section 15 includes a photographing lens for forming an object image, an image sensor for converting an object image into image data and a processing circuit for these components, an aperture and a shutter inserted in an optical path from the photographing lens, and the like. The image data generated by the imaging section 15 is output to the bus 25.

The SDRAM (Dynamic Random Access Memory) 16 is a temporary-storage memory which is an electrically rewritable nonvolatile memory, and used for temporarily storing the image data output from the imaging section 15. The image processing section 17 performs various kinds of image processing such as digital amplification (digital gain adjustment processing) of digital image data, white balance, color correction, gamma ($\gamma$) correction, contrast correction, live-view display image generation, and moving image generation.

Further, the compression/decompression section 20 is a circuit for compressing still image and moving image data temporarily stored in the SDRAM 16 by a compression method such as the JPEG and the TIFF and for decompressing the image data for display or the like. Note that any compression method not limited to the JPEG and the TIFF can be applied to the image compression.

The display processing section 18 causes the display section 19 to display the live view display in photographing and display a reproduced image in reproduction. Further, in the search mode, the display processing section 18 causes the display section 19 to display the search screen and the change screen generated by the search screen display section 11a and the change screen display section 11d, respectively. The display section 19 is connected to the display processing section 18 and has a display such as a liquid crystal monitor or an organic EL disposed on the rear side of the main body or the like, and displays a predetermined image on the screen under the control of the display processing section 18.

The recording/reproduction section 21 stores the image data compressed in the compression/decompression section 20 into the image storage section 22 and reads out the image data of the photographed image stored in the image storage section 22. This read out image data is decompressed in the compression/decompression section 20 and an image is reproduced and displayed on the display section 19 according to this decompressed image data.

The image storage section 22 is connected to the recording/reproduction section 21 and is a recording medium which can be built in or loaded on the main body of the digital camera. A tag (header) of the image data records a photographing date and time, the kind of a photographing scene, a photographing location, a person's name, a collection name, and the like. Note that the photographing date and time is obtained according to date and time information of a clock section which is not shown in the drawing and the photographing location is obtained by the GPS or the like which is not shown in the drawing. The kind of the photographing scene is the kind of a photographing mode selected by a photographer in the photographing or a photographing mode automatically set in the camera. Further, the person's name is identified by a preliminarily registered person's image and name, and the collection name is a name individually set by a user such as "travel" and "event".

Figure 2A:
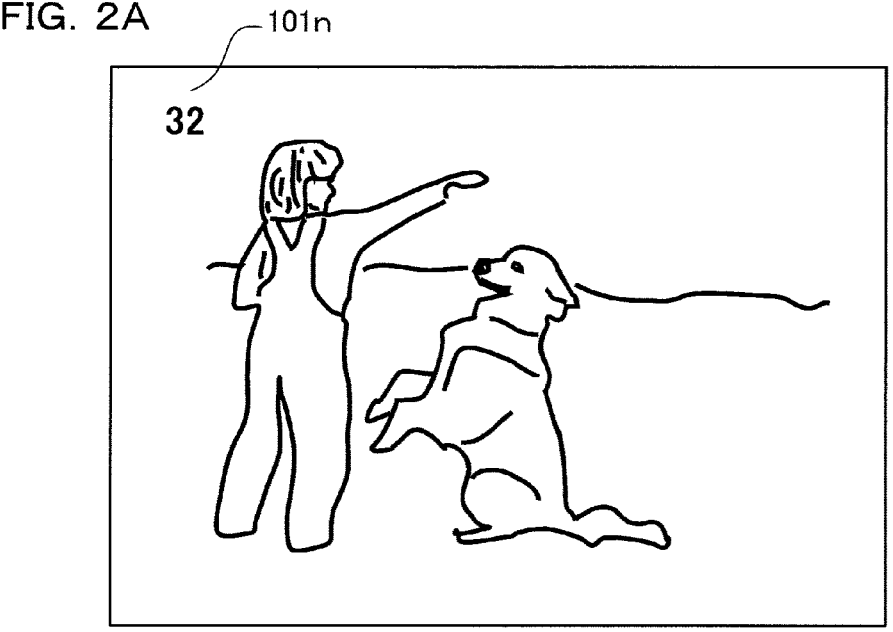
FIGS. 2A and 2B are diagrams showing a single frame image and a search screen, respectively, in a digital camera according to an embodiment of the present invention.

Next, the search screen of the present embodiment will be explained by the use of FIGS. 2A and 2B. FIG. 2A is a reproduction image displayed on the display section 19 in a single frame reproduction mode. An image number 101n is displayed at the upper left of this reproduction image, and shows the 32nd in an example of FIG. 2A. When performing the image search utilizing the photo surfing function, the user operates the mode switch button in the input operation section 13 and selects the search mode (photo surfing mode).

Figure 2B:
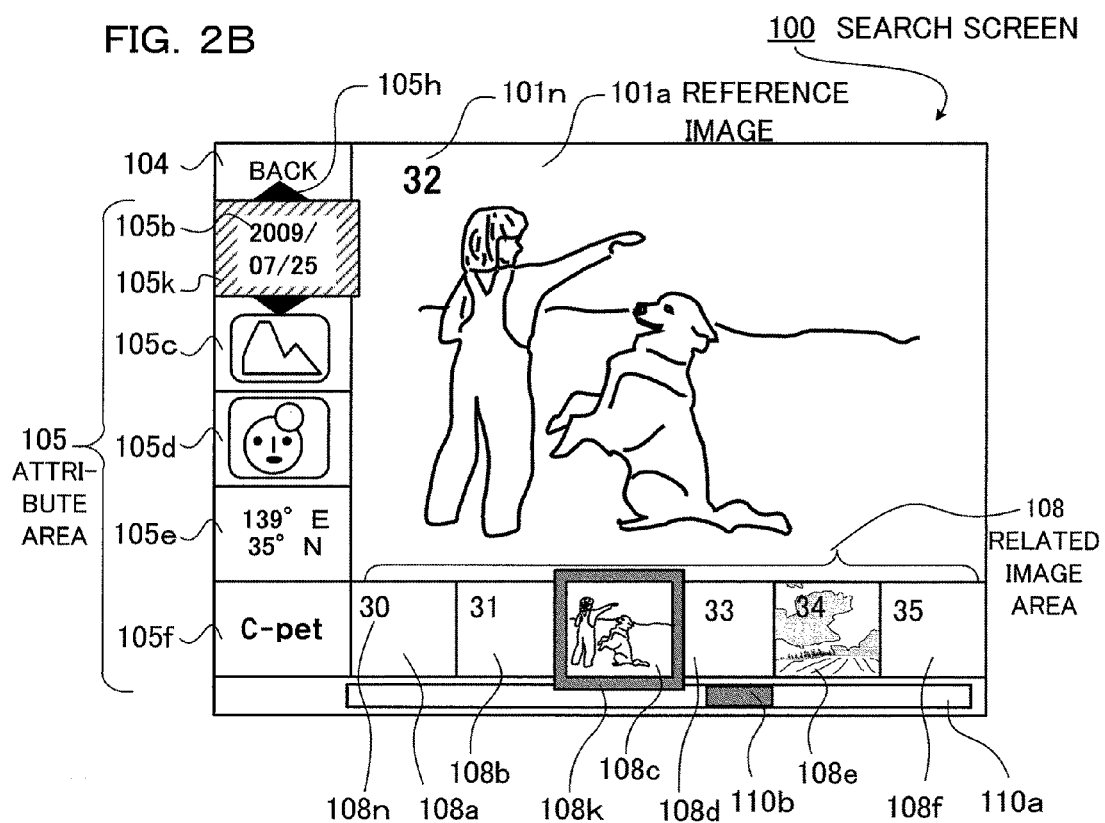

When the photo surfing mode is selected, the search screen 100 as shown in FIG. 2B is displayed on the display section 19. This search screen 100 displays a reproduction image of the image number 32 (hereinafter, simplified as No. 32) as a reference image 101a in an enlarged size. A back button 104 and an attribute area 105 are displayed along a column on the left side of the reference image 101a.

This attribute area 105 displays five kinds of attribute and a specific condition thereof; a photographing date and time 105b, a photographing scene 105c, a person 105d, a photographing position 105e, and a collection 105f. The attribute specific condition in the attribute area 105 indicates the specific condition of the currently displayed reference image. When any attribute in the attribute area 105 is selected by the operation of the up/down key of the cross button, an attribute cursor 105k is displayed at a selected attribute position. Note that Symbol 105h indicates a moving direction of the up/down key.

Further, a related image area 108 is provided on the lower side of the reference image 101a. The related image area 108 displays related images 108a to 108f having the attribute selected by the attribute curser 105k, in thumbnail view. Among the related images 108, the third thumbnail image 108c from the left corresponds to the image displayed as the reference image 101a. A related image cursor 108k having a rectangle thick frame is provided for indicating that the image of 108c is the image corresponding to the reference image. The related image cursor 108k is fixed to the position of 108c. The operation of the right/left key in the cross button scrolls the related image line to the right or left.

A scroll bar 110a is provided on the lower side of the related images 108a to 108f and includes a slider 110b therein. This slider moves to the right or left in response to the operation of the right/left key and indicates the position of the image selected by the related image cursor 108k among all the related images.

In an example shown in FIG. 2B, the related images 108a to 108f display images searched according to the attribute of the photographing date and time 105b for the image of No. 32. Specifically, the other images photographed on Jul. 25, the photographing date and time for the image of No. 32, are displayed. The attribute cursor 105k is attached to the photographing date and time 105b and indicates the selected attribute for the search. The slider 110b indicates the position of the related image displayed at the position of the related image cursor 108k (108c) among all the images photographed on July 25. Note that Symbol 108n shown at the upper left in each of the related images 108a to 108f indicates the image number.

Figure 3A:
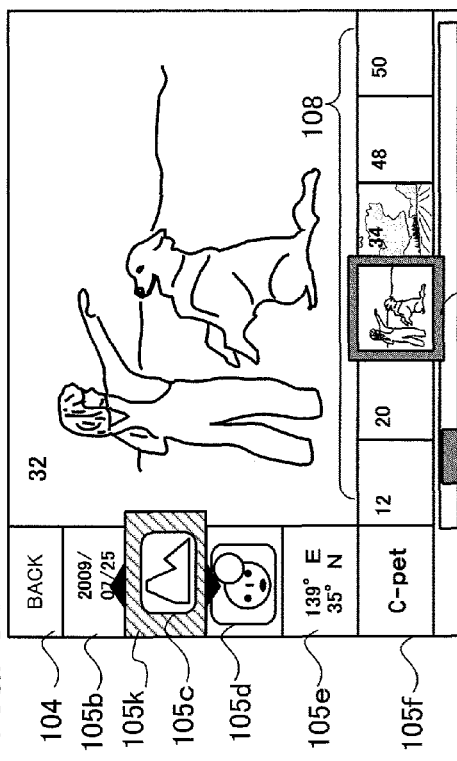
FIGS. 3A to 3D are diagrams illustrating attribute change on a search screen in a digital camera according to an embodiment of the present invention.

The back button 104 is an icon for ending the search screen 100 and returning to the original reproduction image. That is, as shown in FIG. 3A, when the up/down key is operated, the back button is selected, and then an OK button is operated, the screen returns to the single frame reproduction image as shown in FIG. 2A.

An icon for the photographing date and time 105b is provided for searching a photographed image having the same or a similar photographing year, month, and day in the image storage section 22 and for displaying the search result in the related image area 108. In the example shown in FIG. 2B, the icon shows that the photographing year, month, and day of the reference image 101a is Jul. 25, 2009, and since the photographing date and time has been selected as the attribute as described above, the related image area 108 takes Jul. 25, 2009 as the specific condition and displays a part of the images photographed at this date and time in thumbnail view.

Further, an icon for the photographing scene 105c is provided for searching a photographed image having the same photographing scene in the image storage section 22 and for displaying the search result in the related image area 108. The photographing scene includes various modes such as a program mode, a magic filter mode, a portrait mode, and a landscape mode, and the example shown in FIG. 2B shows that the reference image 101a is photographed in the photographing scene of the landscape mode.

An icon for the person 105d is provided for searching a photographed image in which the presence of a person is the same, in the image storage section 22, and for displaying the search result in the related image area 108. A circle mark displayed at the upper right of the icon for the person 105d indicates the case that a person is present in the photographed image, and a cross mark displayed on the upper right indicates the case that a person is not present in the photographed image. In an example of the person 105d shown in FIG. 2B, the circle mark at the upper right indicates that a person is included in the image of the reference image 101a.

An icon for the photographing position 105e is provided for searching a photographed image having the same or a similar photographing position in the image storage section 22 and for displaying the search result in the related image area. The example shown in FIG. 2B indicates that the reference image 101a is photographed at 139 degrees of east longitude and north latitude of 35 degrees. The collection 105f is a classification name provided by a photographer. That is, when the classification name is preliminarily provided by the photographer, the collection name is the provided classification name and called an album name. When this collection 105f is selected, an image of the same collection is searched in the image storage section 22, and the search result is displayed in the related image area 108. The example shown in FIG. 2B indicates that the reference image 101a is an image belonging to "pet".

Next, by the use of FIGS. 3A to 3D, the attribute change by the attribute cursor 105k will be explained. FIG. 3A shows a state in which the back button 104 is selected by the attribute cursor 105k, and when the OK button is operated in this state, the screen returns to a single frame reproduction image as shown in FIG. 2A.

Figure 3B:
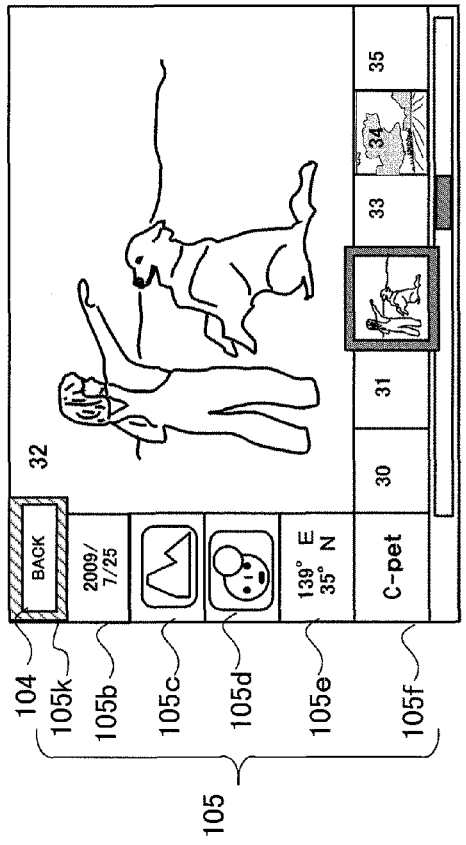
Figure 3C:
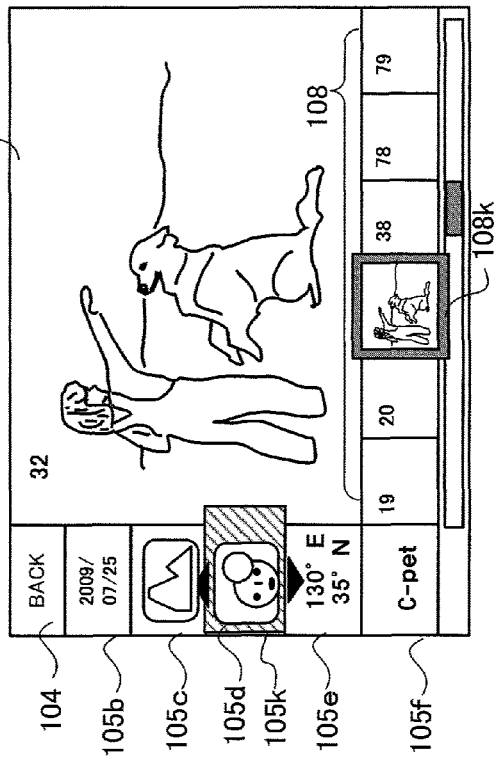

When the attribute cursor 105k is moved to the photographing scene 105c from the state shown in FIG. 2B as shown in FIG. 3B by the operation of the up/down key, the search is performed in the specific condition of the landscape mode. Then, the related image area 108 displays the other images photographed in the landscape mode as the related images. When, in this state shown in FIG. 3B, the related image line is moved to the left by the left key and the image of the image number "34" is selected, the image of the image number "34" is displayed as the reference image 101a as shown in FIG. 3C. At this time, each of the attributes in the attribute area 105 is switched from the attribute of the image number 32 to the attribute of the image number 34 and then the switched attribute is displayed. Specifically, for the attribute displayed in the attribute area 105, the person 105d is changed to no person, the photographing position 105e is changed to 130 degrees of east longitude and north latitude of 32 degrees, and the collection 105*f* is changed to no designation.

Figure 3D:
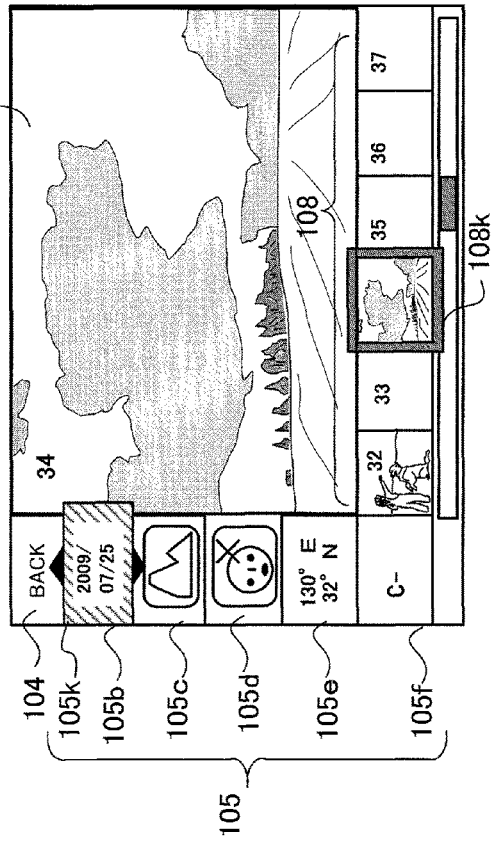

Further, when the attribute cursor 105*k* is moved from the state shown in FIG. 2B to the person 105*d* as shown in FIG. 3D by the operation of the up/down key, the other images each having a face is searched and displayed in the related image area 108.

Next, date and time change will be explained by the use of FIGS. 4A to 4C. In the state of FIG. 2B, the photographing date and time 105*b* is selected by the attribute cursor 105*k*. When the OK button is operated in this state, a change screen 120 is displayed in the display section 19 as shown in FIG. 4A for changing the photographing date and time of the specific search condition. In the change screen 120, an attribute name 121*a* is displayed in the top level, a date and time change screen 122*b* is displayed in the middle level, and a second related image area 124 and the like is displayed in the bottom level.

The attribute name 121*a* in the top level in an example shown in FIG. 4A shows "year, month, and day" indicating that this screen is a screen for changing date and time. Further, a date and time change screen 122*b* displays the photographing date and time shown in FIG. 2B, that is, Jul. 25, 2009, and the date and time is changed by the operation of the up/down key. Here, when the up/down key is operated, the date and time is changed directly to a photographing date having the image data in a skipping manner. Thereby, it is possible to change the photographing date and time quickly. Further, since the date and time without a photographed image is not selected, a user does not need to perform an unnecessary operation.

Date and time information 128 is displayed on the left side of the bottom level in the change screen 120 as the specific search condition set in the date and time change screen 122*b*. In the center part, the second related image area 124 is displayed and an image searched under the condition of the date and time information 128 is displayed. On the right side, total number information 126 is displayed for the related image searched under the condition of the date and time information 128. In an example shown in FIG. 4A, the date and time information of the related image is Jul. 25, 2009, the total photographing number on this date is displayed as "17" in the total number information 126, and five thumbnail images among the images photographed on Jul. 25, 2009 are displayed in the second related image area 124. Note that, while a cursor is not displayed in the second related image area 124 in the change screen 120 of this example, obviously the cursor may be configured to be displayed.

The photographing date and time is changed by the operation of the up/down key during the display of the change screen 120. In an example shown in FIG. 4B, the photographing date and time is changed to Mar. 1, 2009, the total number of the related images on this date is displayed as "8" in the total number information 126, and an image photographed on this date is newly searched and displayed in the second related image area 124. The image on the leftmost side in the second related image area 124 (image of the image number "7" in the drawing) is the top image of the images photographed on March 1.

Figure 4B:
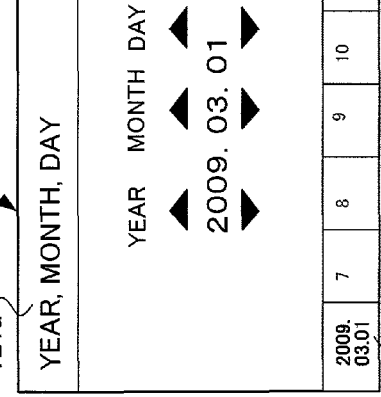
FIGS. 4A to 4C are diagrams illustrating an operation method on a date and time change screen in a digital camera according to an embodiment of the present invention.
Figure 4A:
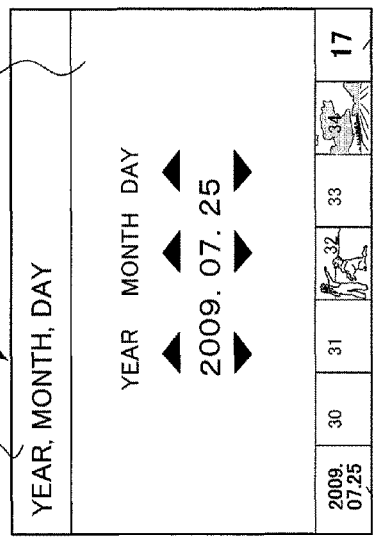
Figure 4C:
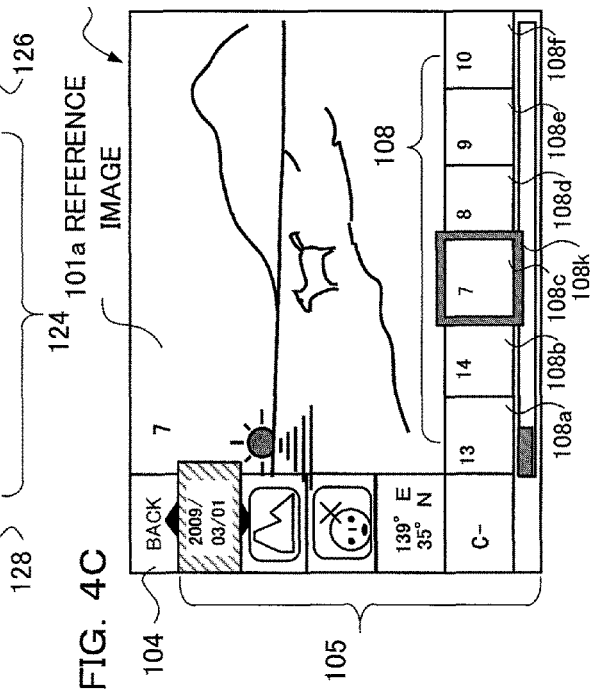

When the OK button in the input operation section 13 is operated in the state shown in FIG. 4B, the specific condition of the photographing date and time 105*b* in the attribute area 105 is changed to Mar. 1, 2009 and the change screen 120 is switched to the search screen 100 in this condition and the search screen 100 is displayed (refer to FIG. 4C). In the search screen 100 shown in FIG. 4C, an image of the reference image 101*a* is the top image (image number 7) photographed on Mar. 1, 2009 and the specific condition in each attribute of this reference image 101*a* is displayed in the attribute area 105 on the left side. That is, the image is photographed on Mar. 1, 2009, the photographing mode is the landscape mode, there is no person, the photographing position is 139 degrees of east longitude and north latitude of 35 degrees, and the collection name is not provided.

Further, the related image area 108 displays the search image searched under the specific condition "Mar. 1, 2009" and displays the image of No. 7, which is displayed as the reference image 101*a*, as the related image 108*c*. This related image 108*c* is the top image of Mar. 1, 2009 and enclosed by the related image cursor 108*k*. The images are arranged in a temporal sequence; from the related image 108*c* sequentially to the images 108*d*, 108*e*, . . . , on the right side, and then to the images 108*a* and 108*b* on the left side, and the image of 108*b* is the last image photographed on Mar. 1, 2009.

In this manner, in the present embodiment, when the photographing date and time 105*b* is selected in the attribute area 105, the change screen 120 for changing the photographing date and time appears by the operation of the OK button in this state, and the search condition of the photographing date and time can be changed. Since the result of this new search is displayed in the related image area 108 in thumbnail view, an image desired to be enlarged among them can be displayed as the reference image 101*a* when the image is moved to the position of the related image 108*c* enclosed by the related image cursor 108*k* by the right/left key. Note that while the present embodiment is configured to perform the search under the condition of photographing "year, month, and day", the condition may be only "year" or "year and month" and obviously a time range may be included.

Figure 5A:
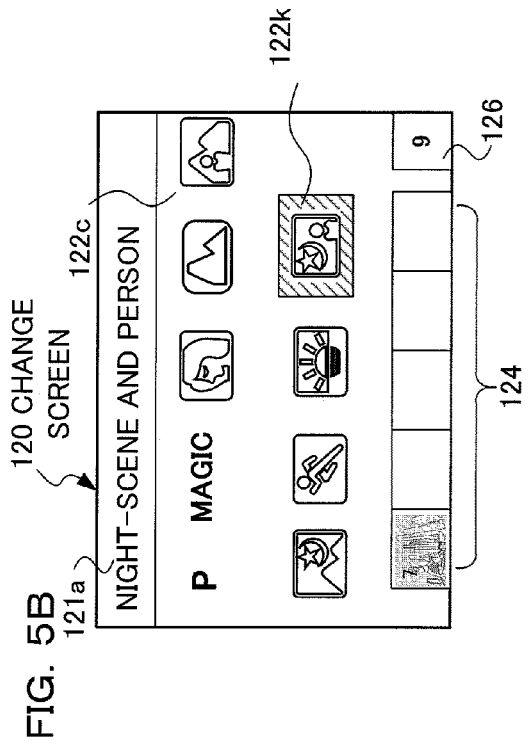
FIGS. 5A to 5C are diagrams illustrating operation on a photographing scene change screen in a digital camera according to an embodiment of the present invention.

Next, the change of the photographing scene will be explained by the use of FIGS. 5A to 5C. In the state of FIG. 2B, the photographing date and time 105*b* is selected by the attribute cursor 105*k*, and when the up/down key is operated in this state, the attribute cursor 105*k* is moved to the photographing scene 105*c*, and the OK button is operated in this state, the change screen 120 is displayed on the display section 19 for changing the photographing scene as shown in FIG. 5A. In the change screen 120, the attribute name 121*a* is displayed in the top level, a photographing scene change screen 122*c* is displayed in the middle level, and the second related image area 124 and the like are displayed in the bottom level.

The attribute name 121*a* in the top level displays the currently selected photographing scene, that is, "landscape" in an example shown in FIG. 5A. Further, the photographing scene change screen 122*c* displays various photographing scenes, that is, P representing the program mode, MAGIC representing the magic filter mode, an icon representing the portrait mode, an icon representing the landscape mode, an icon representing a landscape and person mode, an icon representing a night scene mode, an icon representing a sport mode, an icon representing a sunset mode, and an icon representing a night-scene and person mode. By the operation of the right/left key, a cursor 122*k* is moved and the above icon or the like is selected. Here, the photographing scene change screen 122*c* displays only the kind of the photographing scene for the photographed image recorded in the image storage section 22.

The center part of the bottom level displays the second related image area 124 where related images searched in the scene set in the photographing scene change screen 122*c* are displayed in a line, and the right side displays the total number information 126 of the related images. In the example shown in FIG. 5A, the photographing scene of the related image is the landscape mode, the total photographing number in this scene is displayed as "35" in the total number information 126, and an image photographed in the landscape mode is searched and displayed in the second related image area 124 in thumbnail view as the related image. Note that, while a cursor is not displayed in the second related image area 124 on the change screen 120, obviously the cursor may be configured to be displayed.

When the right/left key is operated during the display of the change screen 120, the photographing scene is changed. In an example shown in FIG. 5B, the photographing scene is changed to the night-scene and person mode, the total number of the related images in this photographing scene is displayed as "9" in the total number information 126, and five images among the images photographed in this night-scene and person mode are displayed in the second related image area 124. An image on the leftmost side of the second related image area 124 (image of the image number "7" in the drawing) is the top image among the images photographed in the night-scene and person mode.

Figure 5B:
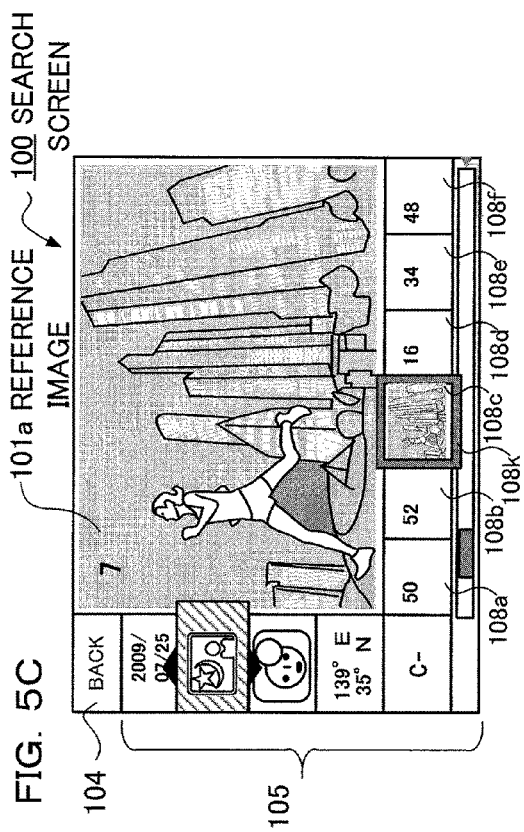
Figure 5C:
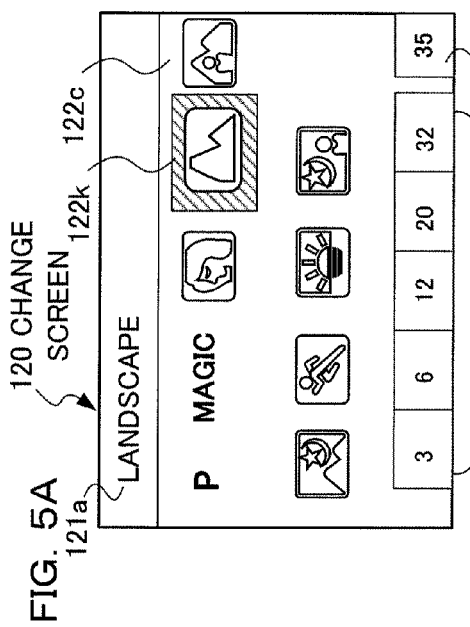

When the OK button is operated in the state shown in FIG. 5B, the specific condition of the photographing mode 105c in the attribute area 105 is changed to the night-scene and person mode and the change screen 120 is switched to the search screen 100 in this condition and the search screen 100 is displayed (refer to FIG. 5C). In this search screen 100 shown in FIG. 5C, the reference image 101a (image No. 7) is the top image photographed in the night-scene and person mode, and the attribute of the image No. 7 shown in this reference image 101a is displayed in the attribute area 105 on the left side. That is, the image is photographed on Jul. 25, 2009, the photographing mode is the night-scene and person mode, a person is present, the photographing position is 139 degrees of east longitude and north latitude of 35 degrees, and the collection name is not provided.

Further, the related image area 108 displays the search image searched under the specific condition "night-scene and person" and displays the image of No. 7, which is displayed as the reference image 101a, as the related image 108c. This related image 108c is the top image in the night-scene and person mode and enclosed by the related image cursor 108k. The images are arranged in a temporal sequence; from the related image 108c sequentially to the images 108d, 108e, . . . , on the right side, and then to the images 108a and 108b on the left side, and the image of 108b is the last image photographed in the night-scene and person mode.

Next, the change of the person will be explained by the use of FIGS. 6A to 6D. In the state of FIG. 2B, the photographing date and time 105b is selected by the attribute cursor 105k, and when the up/down key is operated in this state, the attribute cursor 105k is moved to the person 105d, and the OK button is operated in this state, the change screen 120 is displayed on the display section 19 for changing the person as shown in FIG. 6A or FIG. 613. Here, FIG. 6A shows a case in which an individual name is not registered and FIG. 6B shows a case in which the individual name is preliminarily registered.

In the change screen 120, the attribute name 121a is displayed in the top level, and a face change screen 122d is displayed in the middle level. When the individual name is registered, a person's name and the number of images are displayed in the bottom level as shown in FIG. 6B. In the present embodiment, it is possible to search a face image of the same person utilizing a face recognition function, when an individual face image is preliminarily registered.

The change screen 120 shown in FIG. 6A shows a case in which such a face image (with an individual name) is not preliminarily recorded, and, in such a case, the face change screen 122d displays "with a face" 123a and "without a face" 123b. On the other hand, the change screen 120 shown in FIG. 6B shows a case in which a face image (with an individual name) is preliminarily recorded by the camera, and, in such a case, the face change screen 122d displays "with a face" 123a and "without a face" 123b and additionally displays an icon 123c of the registered person.

Further, a person's name 123x is displayed approximately in the center of the bottom level in the face change screen 122d and the total number information 126 of the photographed images is displayed on the right side of the bottom level. In an example shown in FIG. 6B, the face change screen 122d displays an icon of Jane 123c which shows the face of Jane and the person's name 123x displays "Jane", and the total number of the photographed images is displayed to be "8". Here, in FIG. 6B, ten individual names are registered including Jane and the face of each individual person is displayed in each of the icons. Then, the individual name selected by a cursor is displayed as the person's name 123x.

When the OK button is operated in the state in which "without a face" 123b is selected by cursor 123k in FIG. 6A or FIG. 6B, the person 105d in the attribute area 105 is changed to "without a face" and the search screen 100 is displayed in this condition (refer to FIG. 6C). In the search screen 100 shown in FIG. 6C, the reference image 101a (No. 2) is the top image among the photographed images each of which does not have a person's face, and the attribute of the image No. 2 in this reference image 101a is displayed in the attribute area 105 on the left side. That is, the image is photographed on Jul. 25, 2009, the photographing mode is the landscape mode, there is no person, the photographing position is 135 degrees of east longitude and north latitude of 34 degrees, and the collection name is not provided.

The related image 108 which has been searched under the specific condition of "without a person" is displayed on the lower side of the reference image 101a, where the thumbnail image enclosed by the related image cursor 108k is an image corresponding to the reference image 101a. The arrangement of the related images 108 is the same as that in the above photographing date and time case or photographing scene case, and the photographing date and time becomes newer toward the right and the image (image number 149), which neighbors the thumbnail image enclosed by the related image cursor 108k on the left side, is the newest image.

When the OK button is operated in the state in which the Jane's icon 123c is selected by the cursor in FIG. 6B, the specific condition of the person 105d is changed to Jane and the change screen 120 is switched to the search screen 100 in this condition and the search screen 100 is displayed (refer to FIG. 6D). In this search screen 100 shown in FIG. 6D, the reference image 101a is the top image among the photographed images capturing Jane, and the attribute of this reference image 101a is displayed in the attribute area 105 on the left side. That is, the image is photographed on Jul. 25, 2009, the photographing mode is the portrait mode, the person is Jane, the photographing position is 110 degrees of east longitude and north latitude of 45 degrees, and the collection name is not provided. The related images 108 searched by Jane are displayed on the lower side of the reference image 101a, and this arrangement is the same as that in FIG. 6C and detailed explanation will be omitted.

Next, the change of the photographing position will be explained by the use of FIGS. 7A to 7E. The photographing date and time 105b is selected by the attribute cursor 105k in the state of FIG. 2B, and when the attribute cursor 105k is moved from this state to the photographing position 105e by the operation of the up/down key and the OK button is operated is this state, the change screen 120 is displayed on the display section 19 for changing the photographing position as shown in FIG. 7A.

The attribute name 121a and an operation guide 121b are displayed in the top level of the change screen 120, a photographing position change screen 122e is displayed in the middle level, and the second related image area 124 and the like are displayed in the bottom level. The attribute name 121a displays "map" in this example, and the operation guide 121b displays an operation guideline of the change screen 120 for the user. In the present embodiment, an area frame 123m (refer to FIG. 7B) and a map displayed on the photographing position change screen 122e are enlarged or shrunk by operating a tele button or a wide button for zooming as described hereinafter, and the operation guide 121b displays this operation.

The photographing position change screen 122e displays the map for displaying a photographing point 123p. The photographing point 123p shown by a gray rectangle in the drawing is a minimum unit area of a photographing area and indicates that an image photographed in this position exists in the image storage section 22. Two perpendicular cross lines 123j are lines for selecting one or more points from among the plural photographing points 123p, and a cross point of these cross lines 123j can be moved by the operation of the up/down key and right/left key of the cross button.

Note that, in the present embodiment, the cross point is not moved continuously by the operation of the cross button but jumps to the nearest photographing point. This operation is performed so that the photographing point is selected quickly and the user does not need to perform useless operation. Further, as the map for indicating the photographing position, in the present embodiment, two kinds of map are prepared; a map having a small scale size for displaying an area such as the Far East as shown in FIG. 7A and a map having a large scale size for displaying the whole world. The Far East map is an example of an area map of the world atlas, and maps of Europe and North America and the like may be additionally prepared.

Position information 128b showing the position at the cross point of the cross lines 123j is displayed on the left side in the bottom level of the change screen 120, and the second related image area 124, which shows an image photographed in an area (small area) selected by the cross point in thumbnail view, is provided in the center part of the bottom level, and the total number information 126 is displayed on the right side in the bottom level to indicate the number of images photographed in this area. In an example shown in FIG. 7A, the cross point selected by the cross lines 123j is located at 139 degrees of east longitude and north latitude of 35 degrees (refer to the position information 128b), the number of images photographed in the small area including this cross point (near Tokyo) is 15 (refer to the total number information 126), and five images selected from these images are displayed in the ascending order of image numbers in the second related image area 124 in thumbnail view.

When the wide button for zooming is operated in the state shown in FIG. 7A, the area frame 123m is displayed as shown in FIG. 7B. The area frame 123m includes the photographing point 123p which has been selected by the cross lines 123j and indicates an area wider than the small area. When the small area is widened to the area frame 123m (e.g., Tokyo to the Kanto region), the number of target images is increased. In an example of FIG. 7A and FIG. 7B, the number of the images is increased from 15 to 20.

When the up/down key or the right/left key of the cross button is operated in the state shown in FIG. 7B, the cross point of the cross lines 123j is moved; from Tokyo to Beijing China in an example of FIG. 7C. Along with this movement of the cross point, the photographing position is changed to 110 degrees of east longitude and north latitude of 45 degrees (refer to the position information 128b), the number of images is changed to 29 (refer to the total number information 126), and the related image displayed in the second related image area 124 is also changed to an image photographed near Beijing.

When the wide button is operated again in the state shown in FIG. 7C, the range of the map displayed in the photographing position change screen 122e is switched from the Far East to the whole world (refer to FIG. 7D). In the full size screen showing this whole world, the whole screen is preliminarily divided into equal areas and this divided area is set as the smallest unit for selection. This smallest unit is called a regulated area, and in the present embodiment, the screen is equally divided into nine equal areas vertically and twelve equal areas horizontally and a part of the regulated areas 123n are shown by broken lines in FIG. 7D.

Further, the regulated area 123n where the photographing position exists is provided with gray color for display, and the Asia north east region, the North America east coast, the Africa north region, and the Africa south region exist as the photographing positions. Meanwhile, in FIG. 7D, the area frame 123m exists in the Asia north east region. This is because the wide button has been operated in FIG. 7C, and the immediately previous position of the area frame 123m is kept the same even when the map is switched.

When the up/down key or right/left key of the cross button is operated in the state shown in FIG. 7D, the cross lines 123j are moved and the cross point of the cross lines 123j is moved from the Asia north east region to the Africa south region in FIG. 7E. Further, along with this movement, the area frame 123m is also moved to the Africa south region.

In this manner, the photographing position is changed by the movement of the cross lines 123j in the photographing position change screen 122e, and the related image to be displayed in the second related image area 124 is changed accordingly. Further, the area selected by the cross lines 123j can be enlarged by the operation of the wide button. Moreover, a range of the map displayed in the photographing position change screen 122e can be enlarged by the operation of the wide button.

The operation of the wide button can be returned by the operation of the tele button for zooming. For example, when the tele button is operated in the state of displaying the whole world, the screen is changed into a small scale size map of a selected area (change from FIG. 7D to FIG. 7C). Moreover, when the tele button is operated in the state of displaying the small scale size map, the area frame 123m is erased and the small area is displayed (change from FIG. 7B to FIG. 7A). In addition, when the OK button is operated in the state in which an area or the like is decided, the screen is switched to the search screen and the related image can be searched as in the cases of the other attribute areas.

Note that, while two steps of map scale sizes, the whole world and the region such as the Far East, are used in an example of FIG. 7A to FIG. 7E, three or more steps may be used not limited to this example. Further, while the change of the map scale size and the area frame is performed by the wide button and the tele button for zooming, not limited to this example, various modifications may be performed such as a modification in which a dedicated button is provided and a modification in which the operation guide 121b is touched on a touch panel. Moreover, while both the scale size change of the map and the range change of the area frame are performed by the wide button and the tele button, different operation member may be provided for the respective changes.

Figure 8A:
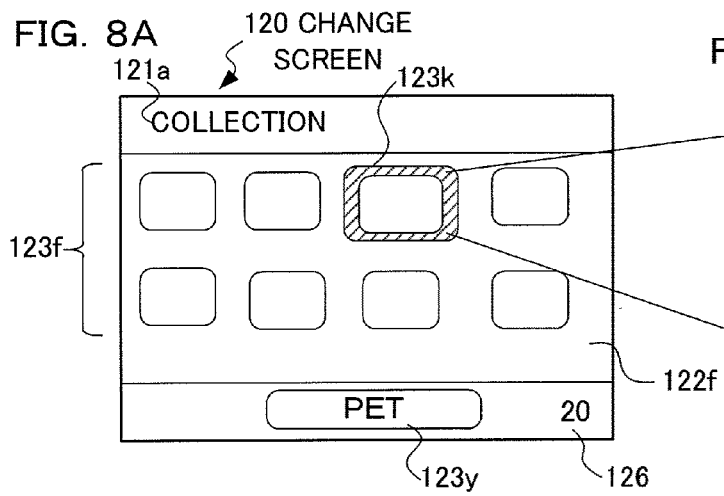
FIGS. 8A to 8D are diagrams illustrating operation on a collection change screen in a digital camera according to an embodiment of the present invention.

Next, the change of the collection will be explained by the use of FIGS. 8A to 8D. The photographing date and time 105b is selected by the attribute cursor 105k in the state of FIG. 2B, and, when the attribute cursor 105k is moved from this state to the collection 105f by the operation of the up/down key and the OK button is operated in this state, the change screen 120 is displayed on the display section 19 for changing the collection as shown in FIG. 8A.

The attribute name 121a is displayed in the top level of the change screen 120, a collection change screen 122f is displayed in the middle level, and a collection name 123y and the like are displayed in the bottom level. The attribute name 121a displays "collection" in this example. Further, various icons 123f belonging to the collection are displayed in the center level. Similar to the above attributes, only a collection included in the image stored in the image storage section 22 is displayed. The collection includes "pet", "travel", "hobby", "family", "office", and the like and can be classified and set preliminarily by the user.

Figure 8B:
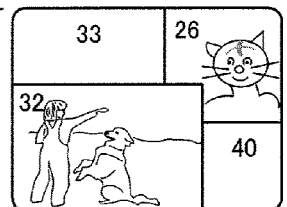
Figure 8C:
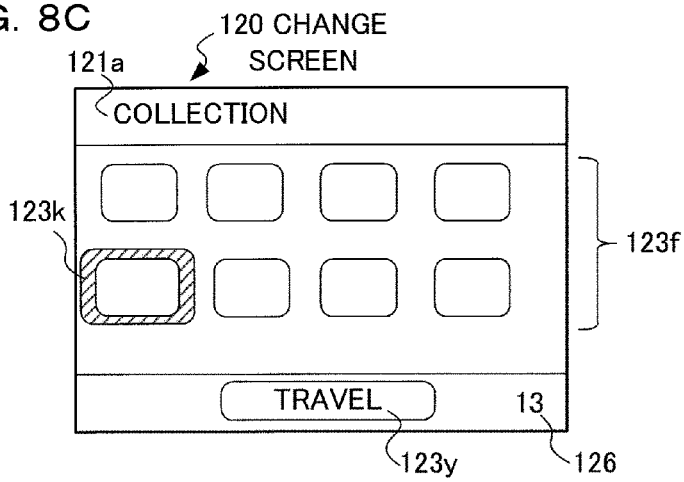

While the icon 123f may use an image created for the icon or may use a representative image as it is, in the present embodiment, the icon is generated by combining plural images belonging to the same collection name. For example, the icon 123f is generated by combining plural images, No. 26, No. 32, No. 33, and No. 40 belonging to "pet" as shown in FIG. 8B. In the middle level of the collection change screen 122f, the plural icons 123f are displayed and a cursor 123k is moved by the operation of the cross button.

A collection name 123y is displayed approximately in the center of the bottom level on the lower side of the collection change screen 122f. This collection name 123y displays a collection name of the icon 123f selected by the cursor 123k. Further, the total number information 126 is displayed on the right side in the bottom level and this total number information 126 indicates the total number of images belonging to the collection selected by the cursor 123k. In an example shown in FIG. 8A, "pet" is selected for the collection and the total number of images belonging to this "pet" is 20.

When the cursor 123k is moved to the lower left icon 123f by the operation of the cross button in the state shown in FIG. 8A, the display of the collection name 123y is changed accordingly. In an example shown in FIG. 8B, the collection name 123y is changed from "pet" to "travel", and the total number information 126 is changed to the number of images belonging to "travel", that is, 13.

Figure 8D:
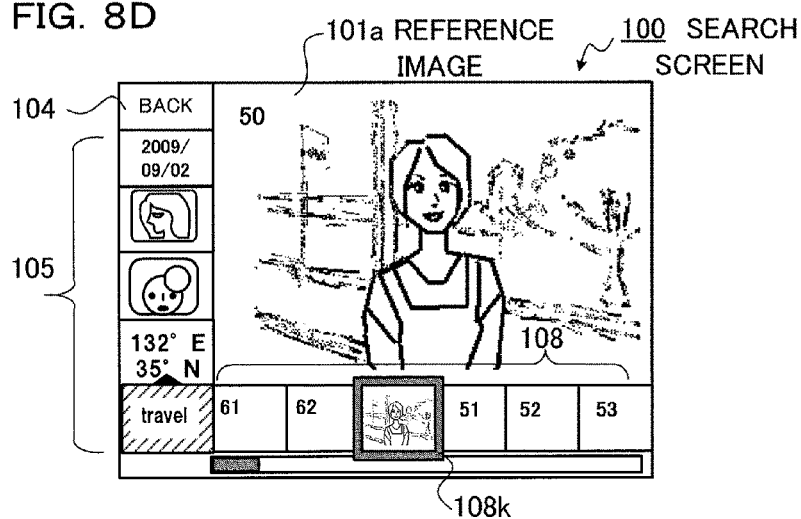
Figure 9:
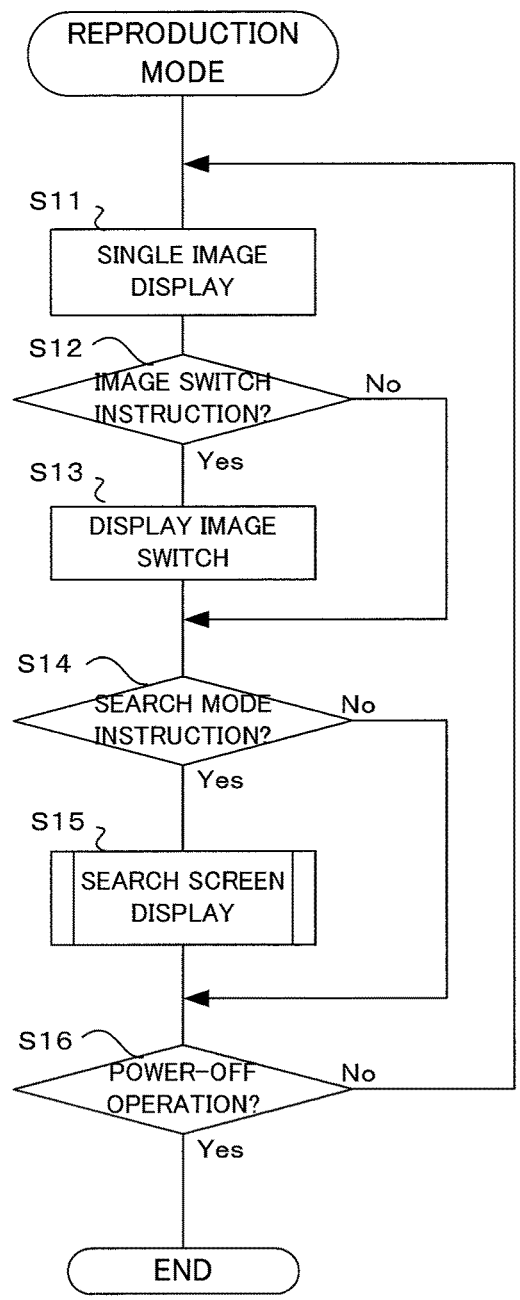
FIG. 9 is a flowchart showing the operation of a reproduction mode in a digital camera according to an embodiment of the present invention.

When the cursor 123k is moved and the OK button is operated in the state in which the icon 123f intended for selection by the user is selected, the specific condition of the collection 105f is changed to "travel" and the change screen 120 is switched to the search screen 100 in this condition and the search screen 100 is displayed (refer to FIG. 8D). In this search screen 100 shown in FIG. 8D, the reference image 101a (No. 50) is the top image among photographed images each collection of which belongs to "travel" at the operation of the OK button, and the attribute of this reference image 101a (image No. 50) is displayed in the attribute area 105 on the left side. That is, the image is photographed on Sep. 2, 2009, the photographing mode is the portrait mode, a person exists, the photographing position is 132 degrees of east longitude and north latitude of 35 degrees, and the collection is "travel". The related image 108 is displayed under the reference image 101a. An image enclosed by the related image cursor 108k is displayed as the reference image 101a. The other contents are the same as those of the above search screen and detailed explanation will be omitted.

As described above, in the present embodiment, the attribute intended for selection by the user is selected from the attribute area 105, and, when the change screen 120 appears by the operation of the OK button in this state for changing the specific condition of the attribute, the specific search condition can be changed. This new search result is displayed in the related image area 108 in thumbnail view, and thereby a desired image among them can be moved to the position enclosed by the related image cursor 108k and displayed as the reference image 101a when enlarged display is desired. That is, starting from the reference image 101a, by changing the attribute, it becomes possible to search an image directly related to the reference image 101a and, by changing the specific condition of the attribute, it is possible to further search an image not directly related to the reference image 101a, and thereby it is possible to search various images successively and enjoy the image search with a feeling the same as that of the so-called net surfing.

Next, a flow for carrying out the reproduction operation in the present embodiment will be explained by the use of flowcharts shown in FIGS. 9 to 12. This flow is carried out by the control section 11. When the reproduction mode starts, first a single image is displayed (S11). Here, the image data of a photographed image stored in the image storage section 22 is read out and the display section 19 displays the photographed image as shown in FIG. 2A.

After the display of the single image, subsequently it is determined whether an image switching instruction has been provided or not (S12). It is determined whether a so-called image forwarding or reversing instruction has been provided or not, that is, the operation state of the operation member such as the cross button is detected and it is determined whether the instruction has been provided or not. When the image switching instruction has been provided in the result of this determination, the display image is switched following the instruction (S13). Here, image data is readout from the image storage section 22 and the display section 19 displays a photographed image following the instruction.

When the display image has been switched in Step S13, or when the image switching instruction has not been provided in the determination result in Step S12, subsequently it is determined whether a search mode instruction has been provided or not (S14). The search mode (photo surfing mode) is a mode in which even an image without a direct relationship can be searched by the search screen 100 as shown in FIG. 2B and can be switched by the operation member such as the mode switch button, and this step detects the operation member such as the mode switch button and determines whether the mode is switched to the search mode or not.

When the search mode instruction has been provided in the determination result in Step S14, subsequently the search screen is displayed (S15). In this step, the control section 11 displays the search screen 100 which has been explained by the use of FIG. 2B and performs searching. Further, when the OK button has been operated, the change screen 120 is displayed and the search of the related image is performed after the attribute has been changed. A detailed flow of this search screen display will be described hereinafter by the use of a flowchart shown in FIG. 10.

When the search screen has been displayed in Step S15, or when the search mode instruction has not been provided in the determination result in Step S14, subsequently it is determined whether power-off operation has been performed or not (S16). Here, it is determined whether the power-off operation of the power button in the input operation section 13 has been performed or not. When the power-off operation has not been performed in this determination result, the process returns to Step 11. On the other hand, when the power-off operation has been performed, power-off processing is performed and the reproduction operation is terminated.

Figure 10:
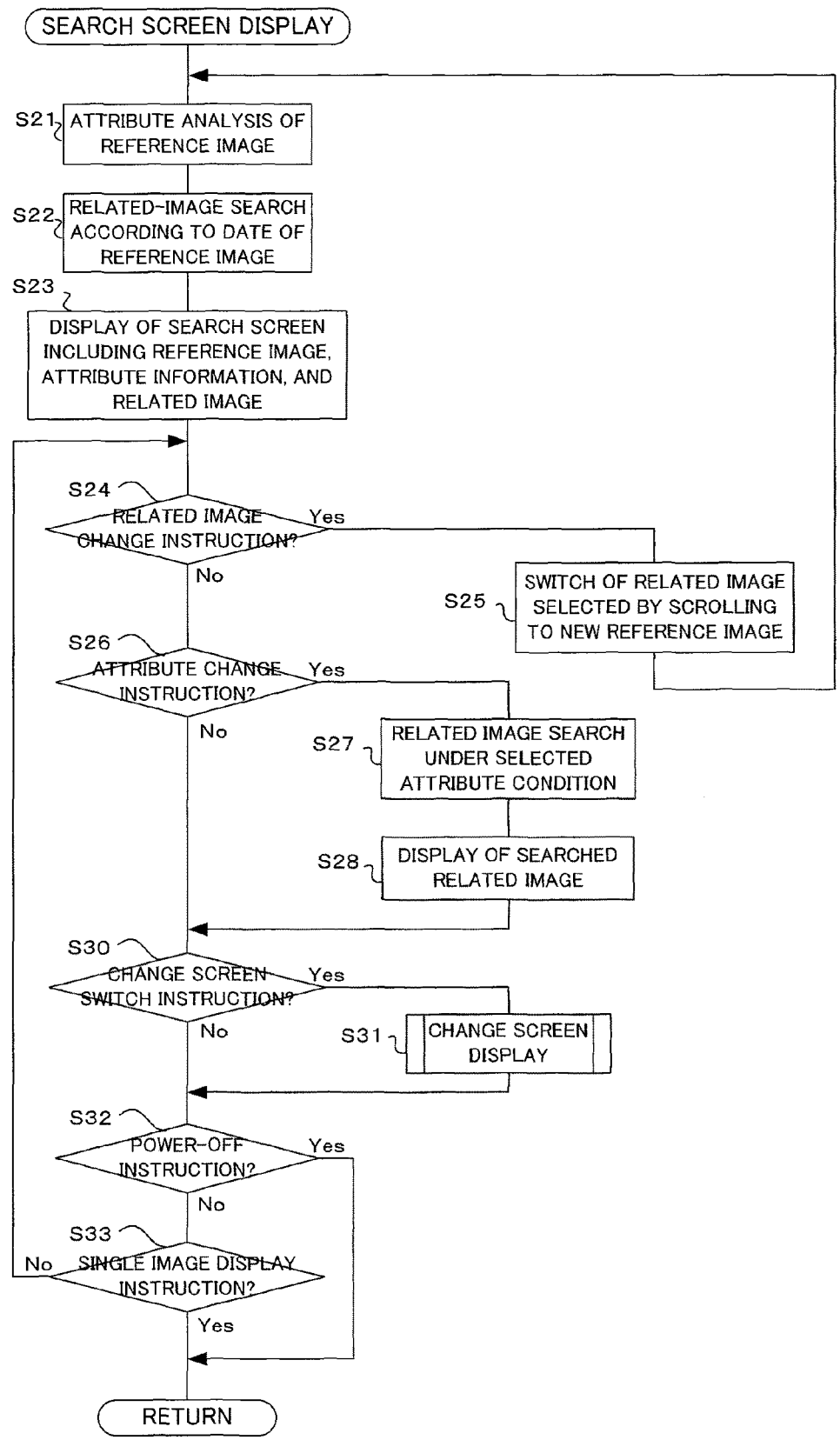
FIG. 10 is a flowchart showing the operation of search screen display in a digital camera according to an embodiment of the present invention.

Next, the operation of the search screen display in Step S15 will be explained by the use of the flowchart shown in FIG. 10. When a flow of the search screen display starts, first an attribute analysis is performed for the reference image (S21). As described above, the tag (header) of the image data stored in the image storage section 22 records a photographing date and time, the kind of a photographing scene, a photographing position, a person's name, a collection name, and the like. Accordingly, the attribute is analyzed according to the tag recorded together with the image data of the image displayed in Step S11.

Successively, the related image search is performed according to the photographing date and time of the reference image (S22). In this example, the photographing date and time is assumed to be set in default as the attribute for searching the related image. While the related image is to be searched according to the selected attribute, the search according to the photographing date and time information is set in default when the search screen display starts at first. Accordingly, in this step, the image search section 11e searches an image photographed on the same or similar year, month, and day from among the images stored in the image storage section 22 according to the photographing date and time information of the reference image.

Next, the search screen including the reference image, the attribute information, and the related image is displayed (S23). The search screen 100 is displayed as shown in FIG. 2B by setting the image read out in Step S11 or Step S13 as the reference image, and by the use of the attribute analysis performed in Step S21, and the related images(s) searched in Step S22.

After the search screen has been displayed, subsequently it is determined whether the change instruction of the related image has been provided or not (S24). As described above, the change of the related image is performed by the movement of the related image line which is caused by the operation of the right/left key of the cross button. Accordingly, this step determines whether the right/left key has been operated or not.

When the change instruction of the related image has been provided in the determination result in Step S24, subsequently the image which has been moved to the position of the related image cursor 108k by the scrolling is switched to a new reference image (S25). Here, when the related image line is moved as shown in FIG. 3C by the operation of the right/left key in the state of the FIG. 3B, for example, the reference image 101a is switched according to the newly selected related image. Since the switch of the reference image has been performed, the process returns to Step S21 and the processing of Step 21 to Step 23 is performed again.

When the change instruction of the related image has not been provided in the determination result in Step S24, subsequently it is determined whether the instruction of the attribute change has been provided or not (S26). As described above, the instruction of the attribute change is performed by the movement of the attribute cursor 105k caused by the operation of the up/down key in the cross button. Accordingly, this step determines whether the up/down key has been operated or not.

When the instruction of the attribute change has been provided in the determination result in Step S26, subsequently the search of the related image is performed under the specific condition of the selected attribute (S27). Successively, the related image searched in this Step S27 is displayed (S28). In Steps S27 and S28, when the attribute cursor 105k is set to the photographing scene 105c (landscape mode), for example, in FIG. 3B by the operation of the up/down key, an image is searched under the specific search condition of this photographing scene 105c and this search result is displayed in the related image area 108.

When the searched related image has been displayed, or when the instruction of the attribute change has not been provided in the determination result in Step S26, subsequently it is determined whether the switch instruction of the change screen has been provided or not (S30). Since the switch to the change screen 120 is performed by the operation of the OK button as described above, this step performs the determination according to the operation state of the OK button.

When the instruction of the switch to the change screen has been provided in the determination result in Step S30, the change screen is displayed (S31). This step displays the change screen 120 which has been explained by the use of FIG. 4A, FIG. 5A, FIGS. 6A and 6B, FIG. 7, FIG. 8A, and the like, and performs the search of the related image after the attribute change. A detailed flow of this change screen display will be described hereinafter by the use of the flowchart shown in FIG. 11.

When the change screen has been displayed or when the instruction of the switch to the change screen has not been provided in the determination result in Step S30, subsequently it is determined whether the power-off instruction has been provided or not as in Step S16 (S32). When the power-off instruction has not been provided in this determination result, subsequently it is determined whether an instruction has been provided or not for displaying the single image (S33). As described above, when the attribute cursor 105k is moved to the back button 104 and the OK button is operated in this state, the search screen 100 is terminated and the screen is returned to the single image screen (refer to FIG. 2A). Accordingly, in this step, the attribute cursor 105k selects the back button 104 and also determines whether the OK button has been operated or not.

When the instruction of the single image display has not been provided in the determination result in Step S33, the process returns to Step S24. On the other hand, when the instruction of the single image display has been provided in the determination result in Step S33, or when the power-off instruction has been provided in the determination result in Step S32, the process returns to the original flow.

Figure 11:
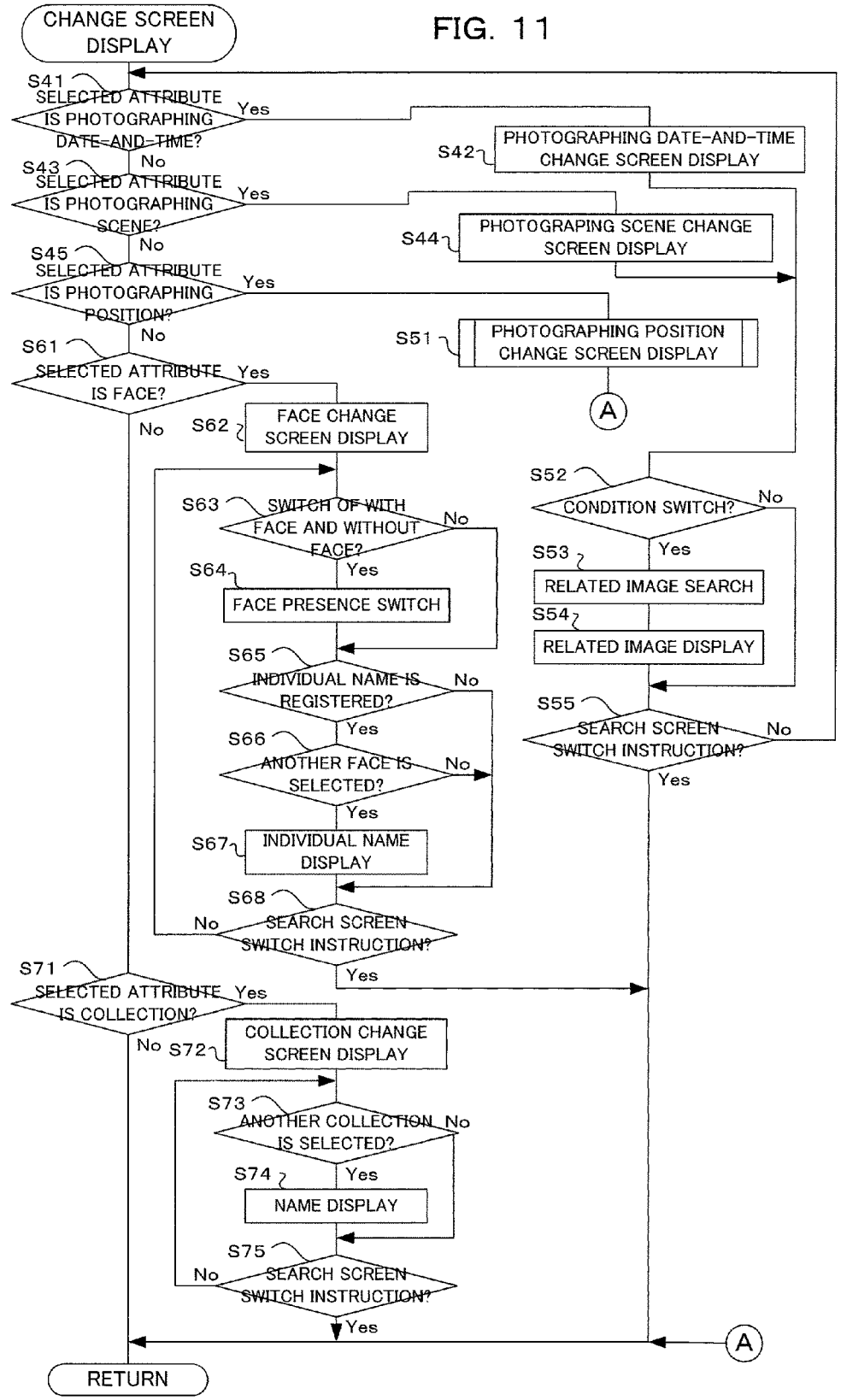
FIG. 11 is a flowchart showing the operation of change screen display in a digital camera according to an embodiment of the present invention.

Next, a flow of the change screen display in Step S31 will be explained by the use of the flowchart shown in FIG. 11. When the change screen display flow starts, first it is determined whether the selected attribute is the photographing date and time or not (S41). Here, it is determined whether the attribute cursor 105k selects the photographing date and time 105b or not. When the selected attribute is the photographing date and time in this determination result, subsequently the photographing date and time change screen is displayed (S42). Here, the display section 19 displays the change screen 120 as shown in FIG. 4A.

When the selected attribute is not the photographing date and time in the determination result in Step S41, subsequently it is determined whether the selected attribute is the photographing scene or not (S43). Here, it is determined whether the attribute cursor 105k selects the photographing scene 105c or not. When the selected attribute is the photographing scene in this determination result, subsequently the photographing scene change screen is displayed (S44). Here, the display section 19 displays the change screen 120 as shown in FIG. 5A.

When the photographing date and time change screen has been displayed in Step S42, or when the photographing scene change screen has been displayed in Step S44, subsequently it is determined whether the condition switch is to be performed or not (S52). Since the photographing date and time is changed by the up/down key and the photographing scene is changed by the movement of the cursor 122$k$ caused by the right/left key as described above, the determination is performed here according to the operation state of the up/down key or the right/left key. Note that, as described above, when the photographing date and time and the photographing scene are switched by the up/down key and the right/left key, respectively, these attributes are made to be switched to only the photographing date and time and the photographing scene, respectively, each of which exists in the photographed image recorded in the image storage section 22.

When the condition switch has been performed in the determination result in Step S52, subsequently the related image is searched according to the switched condition (S53), and the related image is displayed according to this search result (S54). The searched related image is displayed in the second related image area 124 as shown in FIG. 4B and FIG. 5B.

After the display of the related image, subsequently it is determined whether the instruction of the switch to the search screen is to be provided or not (S55). The switch from the change screen 120 to the search screen 100 is performed by the operation of the OK button as described above, and the determination is performed here according to whether the OK button has been operated or not. When the instruction of the switch to the search screen has not been provided in this determination result, the process returns to Step S41 and the display of the change screen is continued. On the other hand, when the instruction of the switch to the search screen has been provided (when the OK button has been operated), the process returns to the original flow and the search screen is displayed.

When the selected attribute is not the photographing scene in the determination result in Step S43, subsequently it is determined whether the selected attribute is the photographing position or not (S45). Here, it is determined whether the attribute cursor 105$k$ selects the photographing position 105$e$ or not. When the selected attribute is the photographing position in this determination result, subsequently the photographing position change screen is displayed (S51). Here, as explained by the use of FIGS. 7A to 7E, an image photographed in the same or a similar photographing position (area) is searched and displayed as the related image. Detailed operation of this photographing position change screen display will be described hereinafter by the use of the flowchart shown in FIG. 12. After the photographing position change screen display has been completed, the process returns to the original flow.

When the selected attribute is not the photographing position in the determination result in Step S45, subsequently it is determined whether the selected attribute is the face or not (S61). Here, it is determined whether the attribute cursor 105$k$ selects the person 105$d$ or not. When the attribute is the face in this determination result, subsequently the face change screen is displayed (S62). Here, the face change screen 120 is displayed as shown in FIG. 6A or 6B.

Successively, it is determined whether the switch of presence of a face is to be performed or not (S63). The switch of presence of a face is performed by the selection of presence of a face by operating the right/left key to move the cursor 123$k$, and selecting the presence of a face. Therefore, here, operation state of the right/left key is determined. When the switch of presence of a face has been performed in this determination result, face presence switch is performed (S64). Here, whether a face is present or not is determined in the search on the search screen.

When the face presence switch has been performed in Step S64, or when the switch of presence of a face has not been performed in the determination result in Step S63, subsequently it is determined whether the individual name has been registered or not (S65). The individual name can be preliminarily registered by the user in the program/data storage section 12 or the like as a part of the data for the icon 123$c$. That is, when the icon 123$c$ is not displayed, it indicates that the individual name has not been registered. This step determines whether the individual name (icon) has been registered or not in these memories When the individual name has been registered in the determination result in Step S65, subsequently it is determined whether another face is selected or not or whether a new face is selected or not (S66). Here, it is determined whether any of the icons 123$c$ of the registered person is selected by the cursor or not. When another face or a new face has been selected in this determination result, the individual name of the selected person is displayed (S67). In an example shown in FIG. 6B, an individual mane Jane is displayed.

After the display of the individual name, or when the individual name has not been registered in the determination result in Step S65 or when another (or a new face) has not been selected in the determination result in Step S65, subsequently it is determined whether the switch instruction of the search screen has been provided or not (S68). Since the switch from the change screen 120 to the search screen is performed by the operation of the OK button as described above, this step determines whether the OK button has been operated or not. When the instruction of the switch to the search screen has been provided in the determination result, the process returns to the original flow and the search screen is displayed.

When the selected attribute is not the face in the determination result in Step S61, subsequently it is determined whether the selected attribute is the collection or not (S71). Here, it is determined whether the attribute cursor 105$k$ selects the collection 105$f$ or not. When the attribute is the collection in this determination result, subsequently the collection change screen is displayed (S72). Here, the collection change screen 120 is displayed as shown in FIG. 8A.

Successively, it is determined whether to select another collection or not (S73). By the operation of the right/left key, the cursor 123$k$ can be moved for selecting any of the collection icons 123$f$. Accordingly, this step determines whether the icon 123$f$ indicating another collection is selected or not. When another collection is selected in this determination result, the display of the name is performed (S74). Here, the name representing this collection is displayed in the collection name 123$y$.

After the display of the name, or when another collection has not been selected in the determination result in Step S73, subsequently it is determined whether the instruction of the switch to the search screen has been provided or not (S75). As describe above, the switch from the change screen 120 to the search screen 100 is performed by the operation of the OK button. Accordingly, this step determines whether the OK button has been operated or not.

When the switch to the search screen has not been provided in the determination result in Step S75, the process returns to Step S73. On the other hand, when the instruction of the switch to the search screen has been provided in the determination result in Step S75, or when the selected attribute is not the collection in the determination result in Step S71, the process returns to the original flow.

Figure 12:
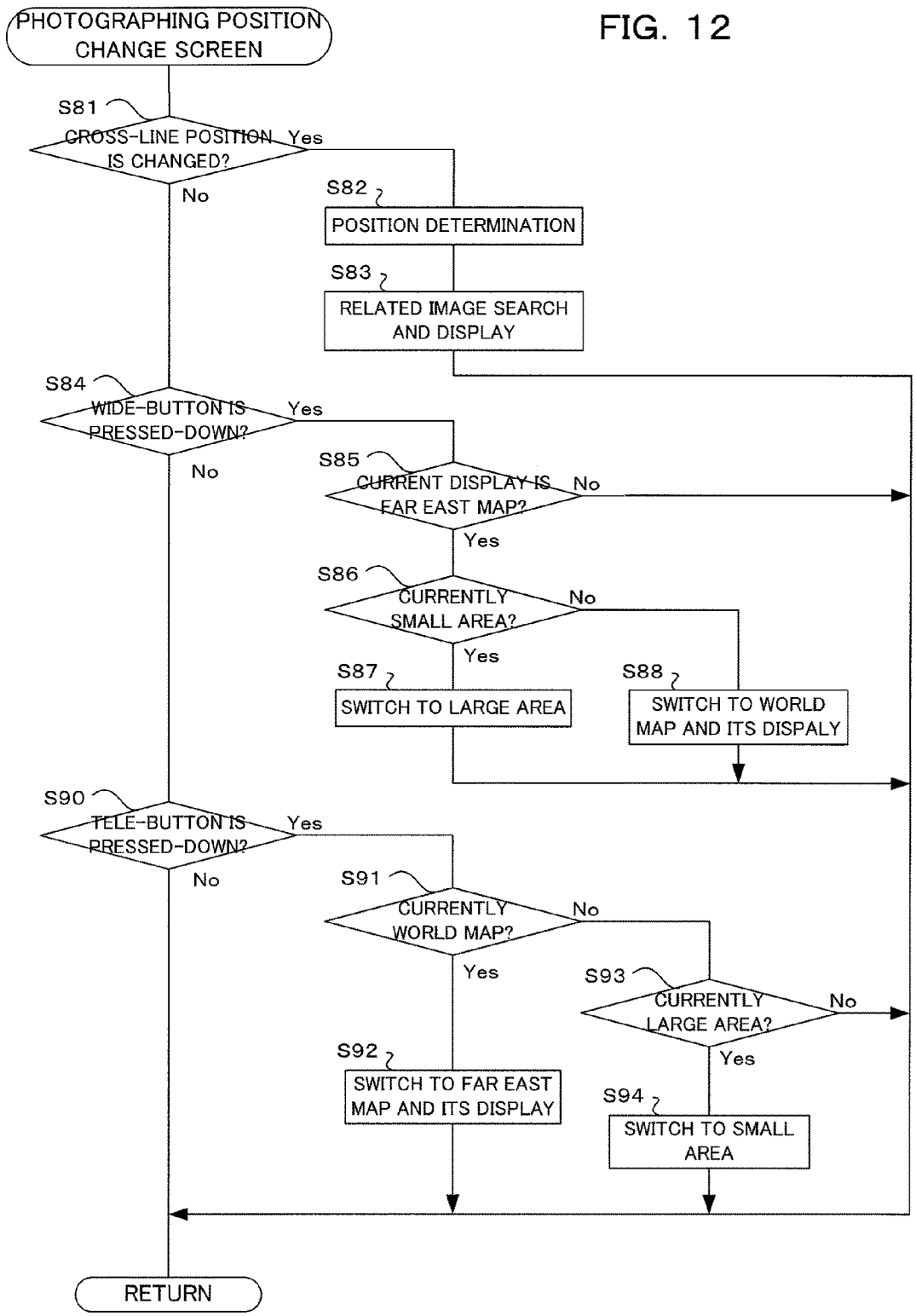
FIG. 12 is a flowchart showing the operation of photographing position change screen in a digital camera according to an embodiment of the present invention.

Next, a flow of the photographing position change screen display flow in Step S51 will be explained by the use of the flowchart shown in FIG. 12. When the photographing position change screen display flow starts, first it is determined whether the cross line position has been changed or not (S81). As described above, in the change screen 120 shown in FIG. 7 for changing the photographing position, the up-down and right-left of the cross lines 123*j* can be moved by the operation of the up/down key and right/left key of the cross button, respectively. In this step S81, it is determined whether the cross line position (cross point) where the up-down and right-left cross lines 123*j* intersect each other has been changed or not.

When the cross line position has been changed in the determination result in Step S81, the position of the cross line is determined (S82), and a related image at this position is searched and displayed (S83). This step searches an image photographed in an area designated by the cross line position in the image storage section 22 and displays this searched image in the second related image area 124. Here, after the display of the related image, the process returns to the original flow.

When the position of the cross line has not been changed in the determination result in Step S81, subsequently it is determined whether the wide button has been pressed down or not (S84). Here, the operation state of the wide button in the zoom button is determined. When the wide button has been pressed down in this determination result, subsequently it is determined whether the map of the Far East has been displayed or not currently (S85). When the map of the Far East has not been displayed in this determination result, the process returns to the original flow.

When the map of the Far East has been displayed in the determination result in Step S85, subsequently it is determined whether the small area is displayed or not currently (S86). As explained by the use of FIG. 7B, when the wide button is pressed down once in the map of the Far East, the small area is enlarged to the area frame 123*m*, and, when the wide button is pressed down once more in the state in which the small area has been widened to the area frame 123*m*, the map of the Far East is switched to the world map.

Accordingly, when the small area is displayed currently in the determination result in Step S86, the small area is switched to a large area (S87) and the area frame 123*m* is displayed, and then a photographed image within this large area is searched and the searched image is displayed in the second related image area 124. On the other hand, when the small area is not displayed currently in the determination result in Step S86, that is, the large area has been already displayed, the map is switched to the world map and the world map is displayed (S88). After the processing of Step S87 or S88, the process returns to the original flow.

When the wide button has not been pressed down in the determination result in Step S84, subsequently it is determined whether the tele button has been pressed down or not (S90). Here, the operation state of the tele button in the zoom button is determined. When the tele button has been operated, processing is performed in reverse to that in the case that the wide button has been operated.

When the tele button has been pressed down in the determination result in Step S90, subsequently it is determined whether the world map is displayed or not currently (S91).

When the world map is displayed currently in this determination result, the map is switched to the map of the Far East and displayed (S92). Along with the switch to the map of the Far East, an image photographed within the currently selected area is searched and the search result is displayed in the second related image area 124. Further, when not the world map but the map of the Far East is displayed in the determination result in Step S91, subsequently it is determined whether the large area is currently displayed or not (S93). That is, it is determined whether the range of the area frame 123*m* is selected or not.

When the large area is not selected currently in the determination result in Step S93, the process returns to the original flow. On the other hand, when the large area is selected in the determination result, the large area is switched to the small area (S94). In the switch to the small area, first the area frame 123*m* is erased, and then only an image in the small area is searched and the search result is displayed in the second related image area 124. After the switch to the small area, the process returns to the original flow.

As explained above, an embodiment of the present invention is configured to be able to change the specific attribute condition of a photographed image to that of an image except the reference image, and thereby it is possible to search images having a weak relationship with one another and to enjoy viewing the images.

Note that an embodiment of the present invention may be configured to enhance the object attribute such as the presence of a person as the attribute condition except the photographing condition attribute such as the photographing date and time and the photographing position. For example, the object attribute may include the kind of an object, that is, the kind such as a human, an animal, and a building.

Further, an embodiment of the present invention is provided with an advantage of browsing related images speedily while variously switching the attribute condition for searching, and thereby may be applied to image browsing for a medical use. In this case, the attribute for the search may include "date", a red color region and a white color region as object colors, and a stomach, a small intestine, large intestine, and the like as photographing regions, for example.

Further, while an embodiment of the present invention is configured to display the attribute area 105 as vertical line to the reference image 101*a* and the related image area 108 as a horizontal line to the reference image 101*a*, both of the areas may be arranged in reverse and have a positional relationship so as to cross each other.

Further, while in an embodiment of the present invention, an example is explained in which the present invention is applied to a camera as an image control apparatus, the image control apparatus may be an image display apparatus such as a personal computer and a television, not limited to the camera. In this case, when the image display apparatus does not include a photographing function, image data may be installed from a photographing device such as a camera and a search function as explained in an embodiment of the present invention may be activated in reproduction.

Moreover, an embodiment of the present invention has been explained by the use of a digital camera as an device for photographing, the camera may be either a digital single reflex camera or a compact digital camera, and may be a moving image camera such as a video camera and a movie camera, and further may be a camera included in a mobile phone, a portable information terminal (PDA: Personal Digital Assistant) and a game console, or the like.

Further, the control section 11 realizes the above control processing by reading out an operation control program stored in the program/data storage section 12 and by executing it, and therefore a control program for such software processing is also to be included in the present invention. In addition, to replace a part of the software processing with hardware is also a design matter.

The present invention is not limited to the above embodiment as it is and can be realized by modifying the constituents in a range without departing from the spirit thereof in the step of implementation. In addition, various inventions can be formed by the optional combination of the plural constituents disclosed in the above embodiment. For example, some of the constituents may be omitted from all the constituents shown in the embodiment. Further, the constituents may be combined optionally across the different embodiments.

What is claimed is:

1. An image control apparatus comprising:
   an image search section searching for at least one related image according to at least one attribute of a reference image;
   a search screen display section including an attribute display section and a related image display section and causing a display section to display a search screen wherein,
      the search screen display section sets an image serving as the reference for the search and causes the display section to display the reference image on the search screen,
      the reference image has attributes,
      the attribute display section causes the display section to display a specific condition corresponding to each of the attributes of the reference image on the search screen, and
      the related image display section causes the display section to display the at least one related image which has been returned in the search by the image search section as at least one image related to the reference image according to a specific condition corresponding to one of the at least one attribute, the specific condition being selected from among the at least one specific conditions on the search screen; and
   a change screen display section causing the display section to display a change screen for changing the specific condition of the one attribute to be used for the search to a condition except the specific condition in each of the attributes related to the reference image.

2. The image control apparatus according to claim 1, wherein
   the change screen display section causes the display section to display the change screen for changing the specific condition of the one attribute selected in the search screen responsive to the receipt of a user instruction to switch the search screen to the change screen,
   the search screen display section displays at least one related image corresponding to the changed specific condition as the new reference image responsive to the receipt of a user instruction to switch the change screen to the search screen after the specific condition has been changed in the change screen display section, and
   the attribute display section displays a condition related to the new reference image as the specific condition in each of the attributes to be displayed.

3. The image control apparatus according to claim 2, wherein
   the change screen display section causes the image search section to search the related image according to the specific condition changed in the change screen and causes the display section to display the searched related image on the change screen.

4. The image control apparatus according to claim 2, wherein
   the change screen display section is configured to be able to change the specific condition for a photographing date and time related to the image to be searched when the attribute to be changed is the photographing date and time.

5. The image control apparatus according to claim 2, wherein
   the change screen display section is configured to be able to change the specific condition for a kind of a photographing scene related to the image to be searched when the attribute to be changed is the kind of the photographing scene.

6. The image control apparatus according to claim 2, wherein
   the change screen display section, when the attribute to be changed is a photographing position, causes the display section to display a map including a photographing position related to the image to be searched on the change screen and changes a range of the map to be displayed on the screen by an instruction according to the photographing position related to the image to be searched.

7. The image control apparatus according to claim 2, wherein
   the change screen display section, when a kind of classification of an image classified specifically in advance is the attribute to be changed, causes the display section to display on the change screen, as an icon indicating a kind of each of the classifications, the icon generated by combination of plural images belonging to each of the classifications.

8. The image control apparatus according to claim 2, wherein
   the change screen display section causes the display section to display an icon classified by an individual name when the attribute of the image including a person is to be changed.

9. The image control apparatus according to claim 1, wherein
   the search screen display section, responsive to the receipt of a user selection of a related the image from among the displayed at least one related image causes the display section to display the selected related image as a new reference image, and
   the attribute display section causes the display to display the specific condition in each of the attributes corresponding to the new reference image.

10. The image control apparatus according to claim 1, wherein
    the attribute display section causes the image attribute to include at least one of a photographing date and time, a kind of a photographing scene in a camera, presence of a person, a photographing position, and a collection name which is, when a classification name is provided preliminarily by a photographer, the classification name provided.

11. The image control apparatus according to claim 1, wherein
    the attribute display section causes the display section to display the specific condition in each of the attributes of the reference image in a line on the screen, and
    the related image display section causes the display section to display the searched related images by arranging them in a direction intersecting with the specific conditions in each of the attributes arranged in a line.

12. An image control method which performs processing of displaying on a display section a search screen for searching for at least one related image, the method comprising the steps of:

searching for the at least one related image according to an image attribute of a reference image;
invoking the display of a search screen including an attribute display section and a related image display section;
setting an image serving as a reference for the search as the reference image;
invoking the display of the reference image on the search screen;
invoking the display of a specific condition in each of the attributes of the reference image on the search screen;
invoking the display of the at least one related image, which has been searched for, as an image related to the reference image according to the specific condition of the attribute selected from among the display of specific conditions on the search screen; and
invoking the display of a change screen for changing the specific condition of the attribute to be used for the search to a condition except the specific condition in each of the attributes related to the reference image.

13. A computer readable recording medium having a program recorded thereon for causing a computer to execute processing of displaying a search screen for searching for at least one related image on a display section, the program comprising the steps of:

searching for the at least one related image according to an image attribute of a reference image;
invoking the display of a search screen including an attribute display section and a related image display section;
setting an image serving as a reference for the search as the reference image;
invoking the display of the reference image on the search screen;
invoking the display of a specific condition in each of the attributes of the reference image on the search screen;
invoking the display of the at least one related image, which has been searched for, as an image related to the reference image according to the specific condition of the attribute selected from among the display of specific conditions on the search screen; and
invoking the display of a change screen for changing the specific condition of the attribute to be used for the search to a condition except the specific condition in each of the attributes related to the reference image.

14. Apparatus for controlling information displayed on a display section, the apparatus comprising:

a) a user input section; and
b) a controller,
   1) causing the display section to display a user selected image,
   2) responsive to receiving, via the user input section, a search mode user instruction, the controller
      A) defining the user selected image as a reference image,
      B) determining attribute condition information associated with the reference image,
      C) searching for at least one related image to the reference image using at least some of the determined attribute condition information, and
      D) causing the display section to display a search screen, the search screen including
         i) a first area displaying the reference image,
         ii) a second area displaying a condition for each of at least one attribute of the reference image, and
         iii) a third area displaying at least some of the at least one related image, and
   3) responsive to receiving, via the user input section, a change screen user instruction for one of the at least one attributes, the controller
      A) causing the display section to display a change screen corresponding to the one attribute, and
      B) responsive to receiving, via the user input section, a user instruction to change a condition of the one attribute,
         i) searching for a new set of at least one related image to the reference image using at least the changed condition of the one attribute, and
         ii) causing the display section to display at least some of the new set of at least one related image on the change screen.

* * * * *